US011922386B2

(12) United States Patent
Sasidharakurup et al.

(10) Patent No.: US 11,922,386 B2
(45) Date of Patent: Mar. 5, 2024

(54) AUTOMATED AND SELF-SERVICE ITEM KIOSK

(71) Applicant: Amazon Technologies, Inc., Seattle, WA (US)

(72) Inventors: Subhash Sasidharakurup, Ranni (IN); Srinivasan Hariram, Bangalore (IN); Mehakinder Singh Oberoi, Ludhiana (IN); Ashish Pal, Jammu (IN); Rajesh Jain, Bangalore (IN); Shanoop Sivadas, Thalassery (IN); Himanshu Singh, Bangalore (IN); Aniket Nagesh Dubhashi, Mapusa (IN); Vinay P. Vaidya, Bangalore (IN); Debasish Das, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 17 days.

(21) Appl. No.: 17/199,883

(22) Filed: Mar. 12, 2021

(65) Prior Publication Data
US 2022/0292475 A1 Sep. 15, 2022

(51) Int. Cl.
G06Q 20/18 (2012.01)
G06Q 10/087 (2023.01)
(52) U.S. Cl.
CPC ........... *G06Q 20/18* (2013.01); *G06Q 10/087* (2013.01)
(58) Field of Classification Search
None
See application file for complete search history.

(56) References Cited

U.S. PATENT DOCUMENTS

| | | | |
|---|---|---|---|
| 5,728,999 A * | 3/1998 | Teicher | G07F 11/30 |
| | | | 235/380 |
| 9,911,290 B1 * | 3/2018 | Zalewski | G06Q 30/0633 |
| 10,318,917 B1 * | 6/2019 | Goldstein | G06Q 20/203 |
| 10,984,282 B2 * | 4/2021 | Hacker | G06V 10/40 |
| 11,210,644 B2 * | 12/2021 | Mikami | G06Q 20/18 |
| 11,315,096 B2 * | 4/2022 | Kubo | G06Q 20/202 |
| 11,398,094 B1 * | 7/2022 | Hallman | G06V 40/103 |
| 11,403,852 B2 * | 8/2022 | Datar | G06V 20/52 |
| 11,416,718 B2 * | 8/2022 | Wu | G06K 9/6288 |
| 11,443,291 B2 * | 9/2022 | Gu | G06Q 20/208 |
| 11,443,503 B2 * | 9/2022 | Higa | G06V 40/20 |
| 11,450,011 B2 * | 9/2022 | Wang | G06Q 20/203 |
| 2013/0284806 A1 | 10/2013 | Margalit | |

(Continued)

OTHER PUBLICATIONS

International Search Report and Written Opinion in International Application No. PCT/US2022/019006, dated Jun. 3, 2022.

*Primary Examiner* — Fateh M Obaid
(74) *Attorney, Agent, or Firm* — Athorus, PLLC

(57) ABSTRACT

Disclosed are systems, methods, and apparatus of an automated and self-service kiosk that allows customers to select inventory items available from the kiosk and walk or move away with selected inventory item(s) without having to process payment, identify the inventory item(s), or provide any other form of checkout. After a customer has picked one or more items and departed the kiosk, the picked items are determined and the customer charged for the items. For example, one or more of detected weight changes measured at the kiosk and/or images generated at the kiosk may be used to identify items picked by the customer from the kiosk.

21 Claims, 20 Drawing Sheets

(56) References Cited

U.S. PATENT DOCUMENTS

| | | | |
|---|---|---|---|
| 2014/0316917 A1* | 10/2014 | Westby | G06Q 20/208 |
| | | | 705/18 |
| 2015/0053757 A1* | 2/2015 | Williams | G06K 7/10009 |
| | | | 235/375 |
| 2015/0310409 A1* | 10/2015 | Holman | G07F 17/0071 |
| | | | 99/485 |
| 2017/0323279 A1* | 11/2017 | Dion | G06Q 20/18 |
| 2018/0372398 A1* | 12/2018 | Cosgrove | G06Q 20/208 |
| 2019/0251776 A1* | 8/2019 | Adelberg | G07F 7/00 |
| 2019/0333039 A1* | 10/2019 | Glaser | G06Q 20/209 |
| 2019/0355049 A1* | 11/2019 | Kulkarni Wadhonkar | |
| | | | G06V 20/00 |
| 2020/0361356 A1* | 11/2020 | Hodge | B60N 3/103 |
| 2020/0387881 A1* | 12/2020 | Smith | G07C 9/37 |
| 2021/0035399 A1* | 2/2021 | Dai | G06K 7/1417 |
| 2022/0011042 A1* | 1/2022 | Cosgrove | G06Q 20/203 |

\* cited by examiner

AUTOMATED AND SELF-SERVICE ITEM KIOSK

BACKGROUND

Automation and self-service have become more and more popular in many different areas of everyday life. For example, car rental agencies now often indicate to customers upon arrival of a parking stall from which to retrieve their automobile, thereby allowing the customer to retrieve their rental and depart in a fully self-service manner. Some stores now offer self-service or automated checkout of items picked by a customer of the store. However, such systems are complex and often require tracking of the customer as they move about the store, detection of active tags affixed to items that are scanned when the items are picked by the customer, and/or scanning of items at a self-service checkout stand.

BRIEF DESCRIPTION OF THE DRAWINGS

The detailed description is described with reference to the accompanying figures.

DETAILED DESCRIPTION

Described is a system, method, and apparatus of an automated and self-service kiosk apparatus ("kiosk") that allows customers to select inventory items available from the kiosk and walk or move away with selected inventory item(s) without having to process payment, identify the inventory item(s), or provide any other form of checkout.

As discussed further below, the kiosk may contain a plurality of inventory items that become accessible to a customer upon identification of the customer and initiation of a session, which may occur when a door or other barrier of the kiosk is released to enable access to the inventory items by the customer. The session completes when the door or other barrier is returned and access to the inventory items is prohibited.

In comparison to existing kiosks or item vending machines, in which a customer interacts with a display to select an item that is then vended or provided to the customer, the disclosed implementations provide the customer with simultaneous access to multiple if not all items of the kiosk and the customer is able to interact with the items before ultimate selection of one or more items. For example, when the user opens a door of the kiosk of the disclosed implementations, initiating a session, the customer may view, pick up, handle, and/or otherwise interact with items within the kiosk without having to first purchase or otherwise pay for the items. For example, during a session, a customer may pick up an item from a shelf within the kiosk, view the item, and then return the item to the shelf without having to pay for or otherwise be charged for the item. In the disclosed implementations, it is only after a session is complete (i.e., access to the items inside the kiosk is no longer available) is a determination made as to whether the customer is to be charged for an item. In the above example, if the customer picks an item from a shelf and then closes the door to the kiosk without returning the item to the shelf, the session is completed, the event of the customer picking the item as part of the session determined, and the customer or an account associated with the customer charged a fee for the picked item that was retained by the customer. In comparison, if the customer picks the item from the shelf, returns the item to the shelf, and then closes the door to the kiosk, the session is completed, it is determined that the customer did not pick an item from the kiosk during the session that was not placed back into the kiosk, and no fee is charged to the customer for the item.

In addition to providing customers with direct access to items of a kiosk without requiring that the customer first purchase the items, the disclosed implementations, as discussed further below, also allow the kiosk to operate with limited or no network connectivity and to remain operational during power outages.

Figure 1:
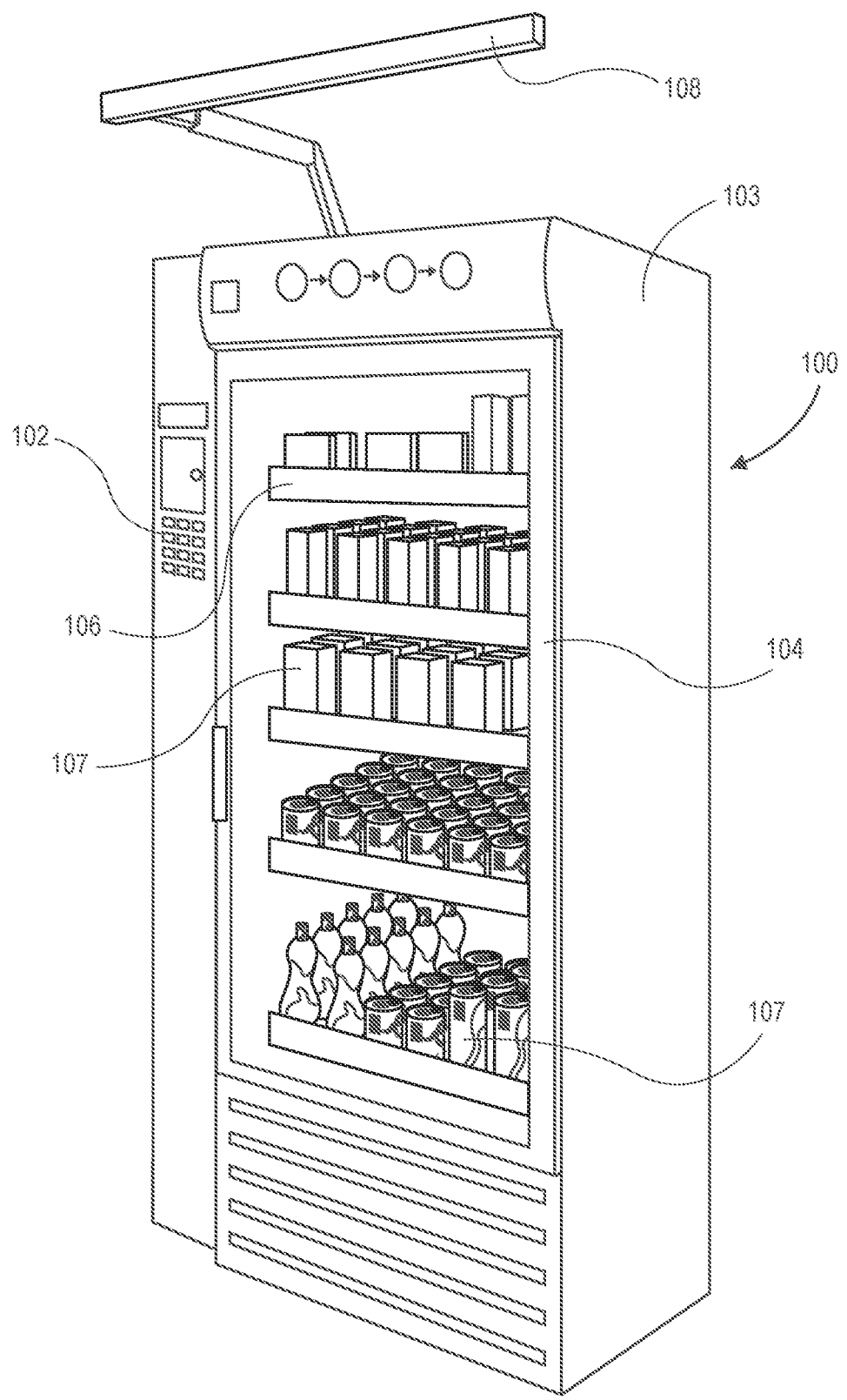
FIG. 1 is a block diagram of a kiosk, in accordance with described implementations.

FIG. 1 illustrates an example kiosk 100, in accordance with described implementations. The kiosk 100 may include a housing 103, which may be made of any of a variety of materials and provide a support and structure to the kiosk. Incorporated into the housing 103 may be a unique identifier component 102, such as a keypad, scanner, touch-based display, biometrics scanner, barcode scanner, quick response code ("QR code") scanner, or any other type of component that is operable to monitor for a unique identifier. The kiosk 100 also includes a door 104 or other barrier that may be engaged or disengaged to prohibit or allow access to inventory items 107 contained within an interior of the housing 103 of the kiosk 100. The door 104 may include or utilize a locking mechanism, such as a mechanical locking mechanism, an electromagnetic locking mechanism, a solenoid locking mechanism, a magnetic locking mechanism, etc. Within the interior of the housing may be one or more shelves 106, each of which are able to hold one or more inventory items 107. Likewise, as discussed further below, each shelf 106 may include one or more weight sensors that are operable to measure a total weight of items placed in an area of the shelf corresponding to the weight sensor. For example, a shelf 106 may have one or more weight sensors. In some implementations, each shelf may be divided into one or more areas and each area may have a single corresponding weight sensor. Likewise, each area of a shelf may be assigned to a single inventory item type such that all items placed in that area, or all items that are supposed to be placed in that area, correspond to a same item type and have the same or similar item information (e.g., each item type has a similar item weight). The kiosk 100 may also include one or more imaging elements 108, such as cameras. In some implementations, as illustrated, the one or more imaging elements 108 may be positioned above and forward of the door 104 of the kiosk and oriented downward to enable image generation of image data of a hand of a customer reaching into and out of the kiosk 100.

As a customer approaches the kiosk 100, the customer is identified, such as through detection of an active tag, like a Radio Frequency Identification ("RFID") tag, in possession of the customer, scanning a bar code presented by the customer using the unique identifier component 102, receiving a keyed input, image processing of images generated by the one or more imaging elements 108 to detect the customer and determine the identity of the customer, etc. Upon customer identification, a locking mechanism of the door 104 of the kiosk 100 is disengaged such that the door may be moved from a closed position to an open position, thereby providing the customer access to inventory items 107 stored on the shelves 106 within the interior of the housing 103 of the kiosk 100.

As discussed in further detail below, upon customer identification and disengagement of the door, even if a network connection from the kiosk 100 becomes reduced or unavailable and/or power to the kiosk 100 is interrupted, the customer may still interact with and select items from the kiosk as if network connection and power were available. The kiosk 100, as discussed herein, may collect the data utilized to determine the event (e.g., item pick, item place), process the data to determine the event, and provide the determined event information and/or collected data at a later time when network connection and/or power is restored.

As the customer interacts with inventory items 107 within the kiosk 100, weight sensors (discussed below) and/or imaging element(s) 108 of the kiosk 100 are operable alone or in combination to record weight sensor data and/or image data, respectively, indicative of an item pick of an inventory item 107 from a shelf 106 of the kiosk 100 by the customer and/or an item place of an inventory item 107 onto a shelf 106 of the kiosk 100 by the customer. An item pick and an item place are each referred to herein as an event. An "event," as used herein, includes an action (pick, place) and an item.

Upon closure of the door 104 of the kiosk 100, the session is completed and the recorded weight sensor data and/or image data is processed to detect events that occurred during the session and to determine the action and the item involved in each determined event. In some implementations, a laddered algorithm may be used to determine an identity of an inventory item 107 involved in an event using one or more of inventory information (kiosk inventory information and/or kiosk area inventory information) corresponding to an area within the kiosk at which the event occurred, weight sensor data received from weight sensors of the area within the kiosk at which the event occurred, and/or image data received from imaging element(s) 108 of the kiosk at the beginning or prior to the event and/or at the end or following the event (post event). Kiosk inventory information may include, for example, indications of inventory item types at different areas within the kiosk 100, the size, shape, and/or average item weight of inventory items, the quantity of inventory items, the weight of each item of inventory within the kiosk, etc. Kiosk area inventory information may include, for example, the inventory item type(s) associated with the area, the size, shape, and/or average item weight of the inventory item type(s) associated with the area, the quantity of inventory items at the area, the weight of each item at the area, etc.

Weight sensor data from a weight sensor positioned on a shelf 106 of the kiosk 100 may be used to detect the occurrence of an event (e.g., item pick or item place) at an area of a shelf within the kiosk, for example, through detection of a weight change. The weight sensor data and item information for an inventory item 107 known to be located in the area of a shelf 106 corresponding to the weight sensor (e.g., from kiosk inventory information) may be used to uniquely identify the inventory item involved in the event. If the inventory item cannot be uniquely identified from the weight sensor data and item information, the inventory information and the weight sensor data may be combined and further processed with image data from the one or more imaging elements to identify the inventory item involved in the event. If the inventory item involved in the event still cannot be uniquely identified, the item information for inventory items at the area within the kiosk at which the event occurred, the weight sensor data, and the image data may be provided to an agent for manual identification of the inventory item involved in the event.

Upon item identification of an inventory item involved in an event, such as an item pick, the cost of the inventory item (in the event of an item pick) is charged to an account of the customer or otherwise associated with or applied to the customer. Likewise, the inventory count for the inventory item at the kiosk may also be updated.

Figure 2:
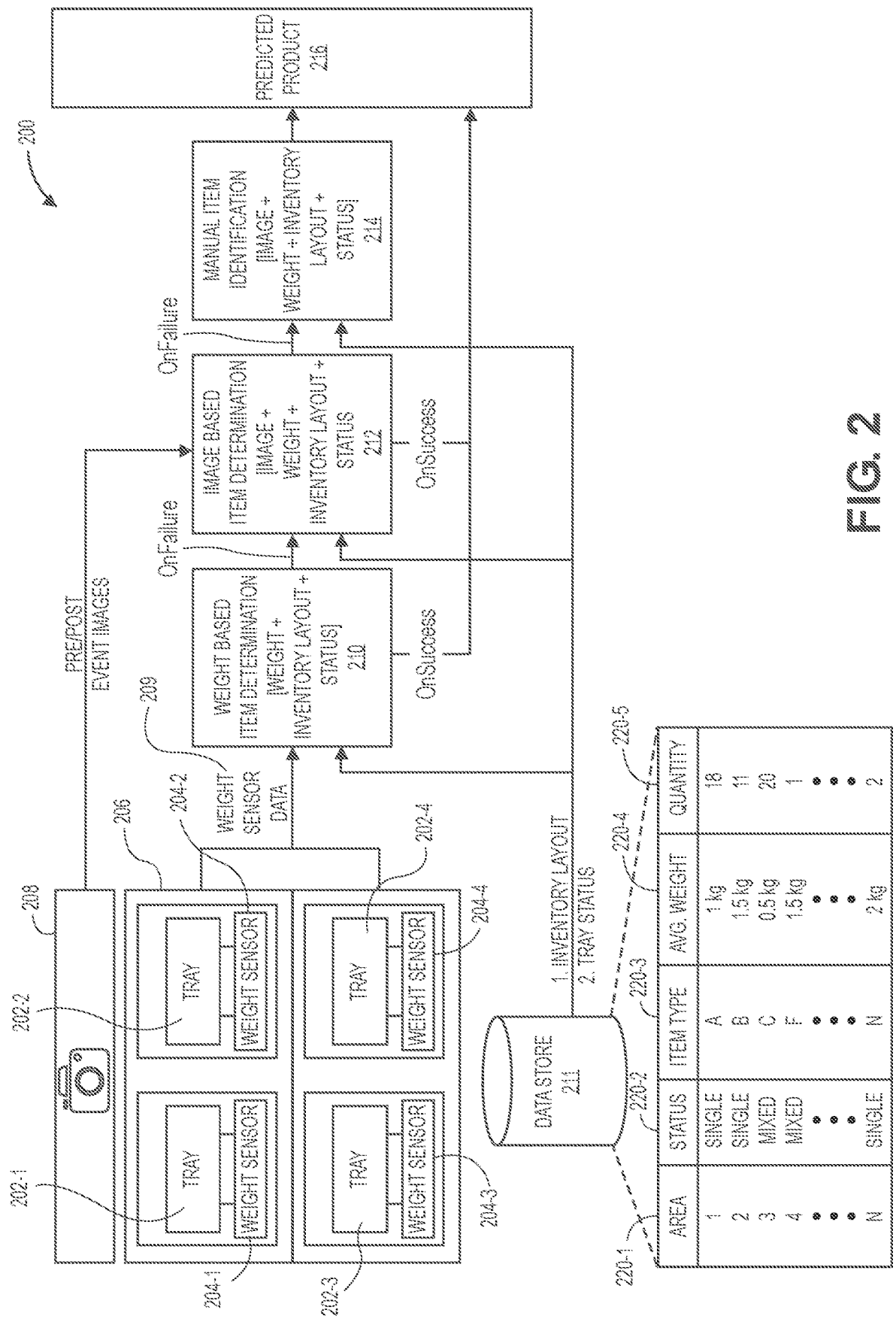
FIG. 2 is a schematic diagram illustrating the identification of items picked/placed from a kiosk, in accordance with described implementations.

FIG. 2 illustrates a block diagram 200 of additional details of the example kiosk illustrated in FIG. 1, in accordance with described implementations. As illustrated, the example kiosk includes one or more imaging elements 208 and shelves 206. The shelves 206 may hold one or more trays, such as trays 202-1, 202-2, 202-3, 202-4. The trays may be affixed to the shelves and/or removable to allow for different configurations of inventory items on the trays. Each tray 202 may hold one or more inventory items that sit or rest upon a surface of the tray. The trays 202 may be removable for cleaning and/or to reconfigure the kiosk with different sizes of trays, which may be used to hold different size inventory items. Improving the cleanability of the kiosk, such as through removable trays, may increase the longevity and improve the accuracy of the kiosk components, such as the weight sensors 204. In other implementations, the tray may be omitted and inventory items placed directly on the shelf/weight sensor within each area.

Each tray may include or be placed upon a weight sensor, such as weight sensors 204-1, 204-2, 204-3, 204-4. As discussed above, when an inventory item is picked from a tray 202 within the kiosk or placed onto a tray 202 within the kiosk, the weight sensor included in the tray or upon which the tray is placed detects a weight change resulting from the removal or placement of the inventory item. The detected weight change, represented as weight sensor data 209, is transmitted from the weight sensor 204 to a weight based item determination component 210. In addition to providing the weight sensor data, the identity of the weight sensor 204, the tray 202 corresponding to the weight sensor 204, the shelf 206 upon which the weight sensor is placed, the area of the shelf corresponding to the weight sensor 204, and/or other identifier that may be used to determine a tray 202 or area corresponding to the weight sensor data 209, may also be provided or included with the weight sensor data.

The weight based item determination component 210, in response to receiving the weight sensor data 209, may obtain from a data store 211 kiosk inventory information for the kiosk, tray status/area information for the tray/area corresponding to the weight sensor, and/or other information that may be used to determine inventory items positioned on the tray 202 or at the area corresponding to the weight sensor data. As illustrated, the data store 211 may include any of a variety of information for inventory item types, trays/areas, the kiosk, etc. For example, for each area of a shelf, or tray 220-1, such as trays 1, 2, 3, 4, through N, the data store 211 may maintain information including, but not limited to, the status 220-2 of the tray/area, the item type 220-3 of inventory items associated with the tray/area, the average weight 220-4 of the item types associated with the tray/area, the quantity 220-5 of items known to be at the tray/area, etc. Such information may be referred to herein as kiosk area information. The status 220-2 may indicate whether the tray/area includes only a single inventory item type or if multiple different inventory item types are positioned on the tray/area, referred to herein as a mixed status. For example, the expanded view of the data store 211 indicates that tray/areas 1, 2, and N have a status 220-2 of single while tray/area 202-4 has a status of mixed. Likewise, the item type 220-3 may indicate the item type of inventory items associated with that tray/area and the average weight 220-4 may indicate the average weight of that item type. While the illustrated example shows a single data table, in other implementations multiple data tables may be included in the data store 211. For example, a separate data table may be maintained for each area and/or for each shelf. In still other examples, a data table may be maintained indicating items that have been placed in an incorrect area within the kiosk.

Based on the kiosk inventory information and the weight sensor data 209, the weight based item determination component 210 attempts to uniquely identify the inventory item type involved in the event. In some implementations, the weight sensor data may indicate both a weight measured by the weight sensor at the start of an event (event start weight) and a weight measured by the weight sensor at the end of the event (event end weight), such as when the measured weight change stabilizes. In other examples, the weight sensor data 209 may only indicate the difference between the weight measured at the start of the event and the weight measured at the end of the event (event weight change).

If the weight based item determination component 210 can uniquely identify the inventory item type involved in the event, an indication of the uniquely identified inventory item type is provided to the predicted product component 216. If the weight based item determination component 210 cannot uniquely identify the inventory item type involved in the event, the weight sensor data 209, and the inventory information (kiosk inventory information and/or kiosk area inventory information) are provided to the image based item determination component 212.

The image based item determination component 212 utilizes the weight sensor data 209, kiosk inventory information and/or kiosk area inventory information obtained from the data store 211, and images generated from the imaging element(s) 208 to attempt to uniquely identify the inventory item type involved in the event. For example, the image based item determination component 212 may process images of the kiosk that are generated before, during, and/or after the occurrence of the event in an effort to identify an inventory item of an inventory item type represented in one or more of those images that is being held by a customer (e.g., picked from the kiosk or placed into the kiosk). As discussed further below, information from the processed image(s) may be used in conjunction with the weight sensor data 209 and/or inventory information from the data store 211 to attempt to uniquely identify the inventory item type involved in the event. If the image based item determination component 212 can uniquely identify the inventory item type involved in the event, the identity of the inventory item is provided to the predicted product component 216. If the image based item determination component 212 cannot uniquely identify the inventory item type of the inventory item involved in the event, the image data, weight sensor data 209, and the inventory information is sent for manual identification 214. During manual identification, an agent may review one or more of the weight sensor data 209, inventory location information, and/or the image(s) generated by the imaging element(s) 208 before, during, and/or after the occurrence of the event to determine the identity of the inventory item type of the inventory item involved in the event. Once identified, the identity of the inventory item type of the inventory item is provided to the predicted product component 216.

Figure 3A:
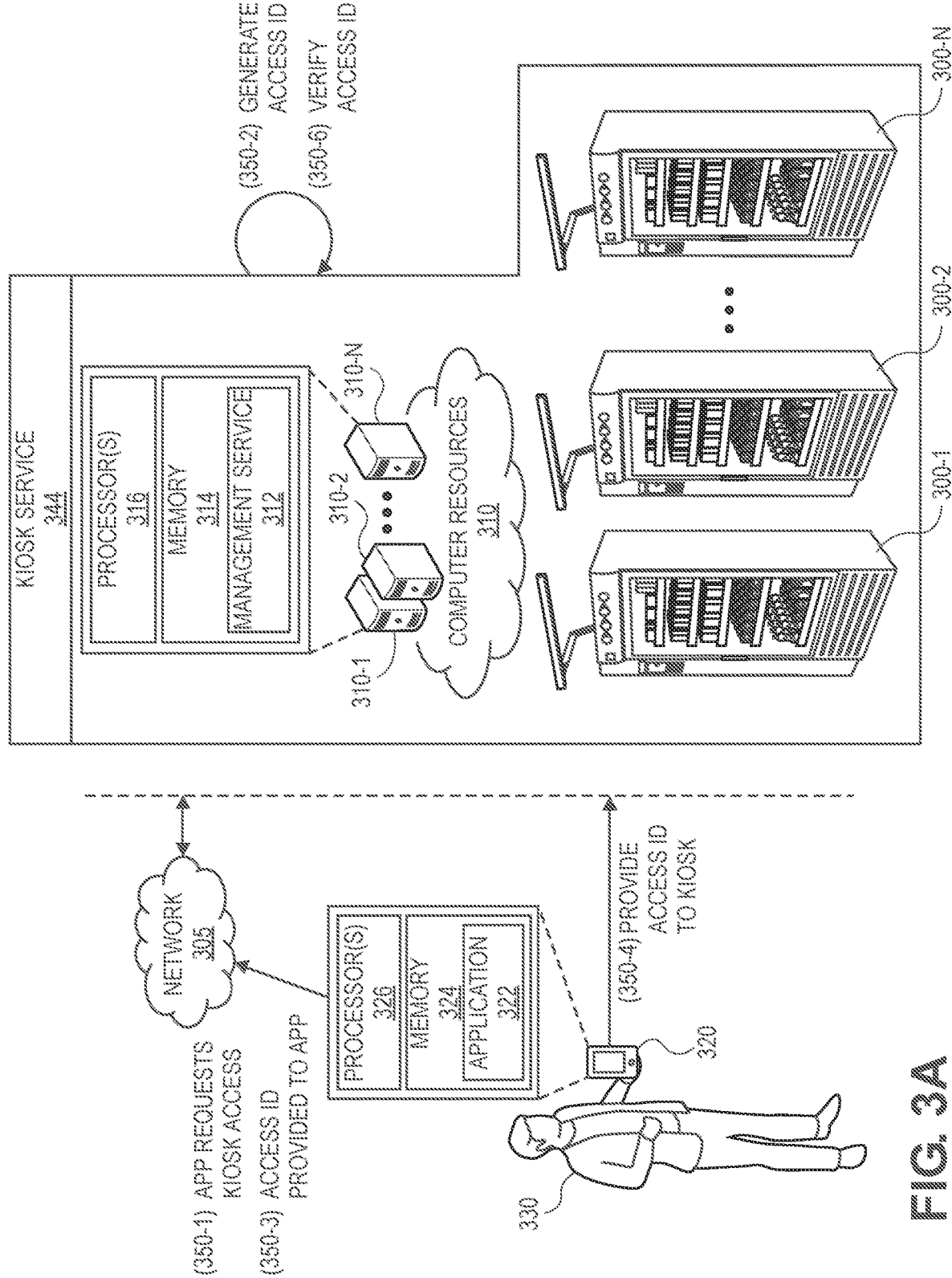
FIGS. 3A through 3C illustrate a transition diagram of a user interacting with a kiosk, in accordance with described implementations.
Figure 3B:
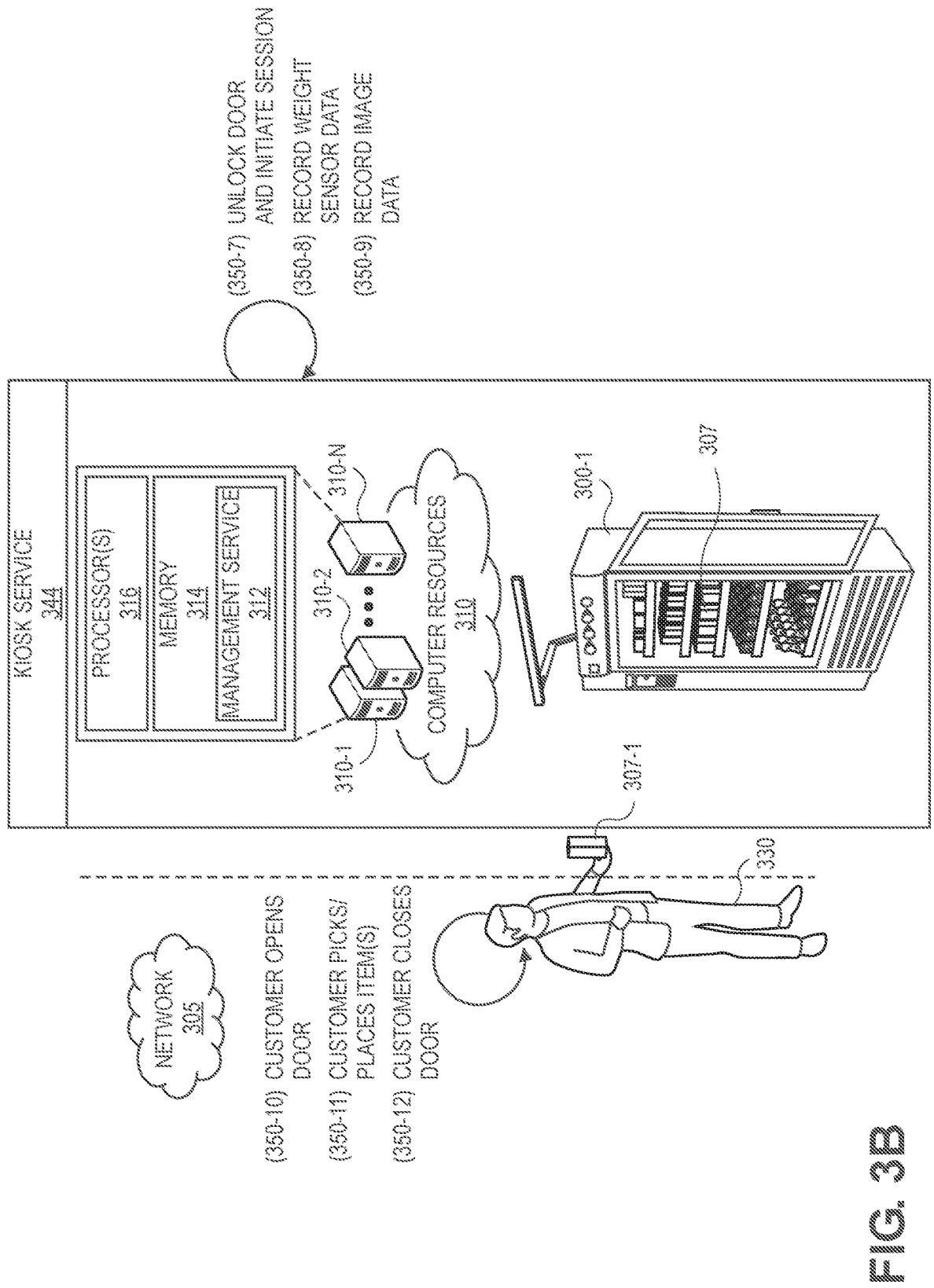
Figure 3C:
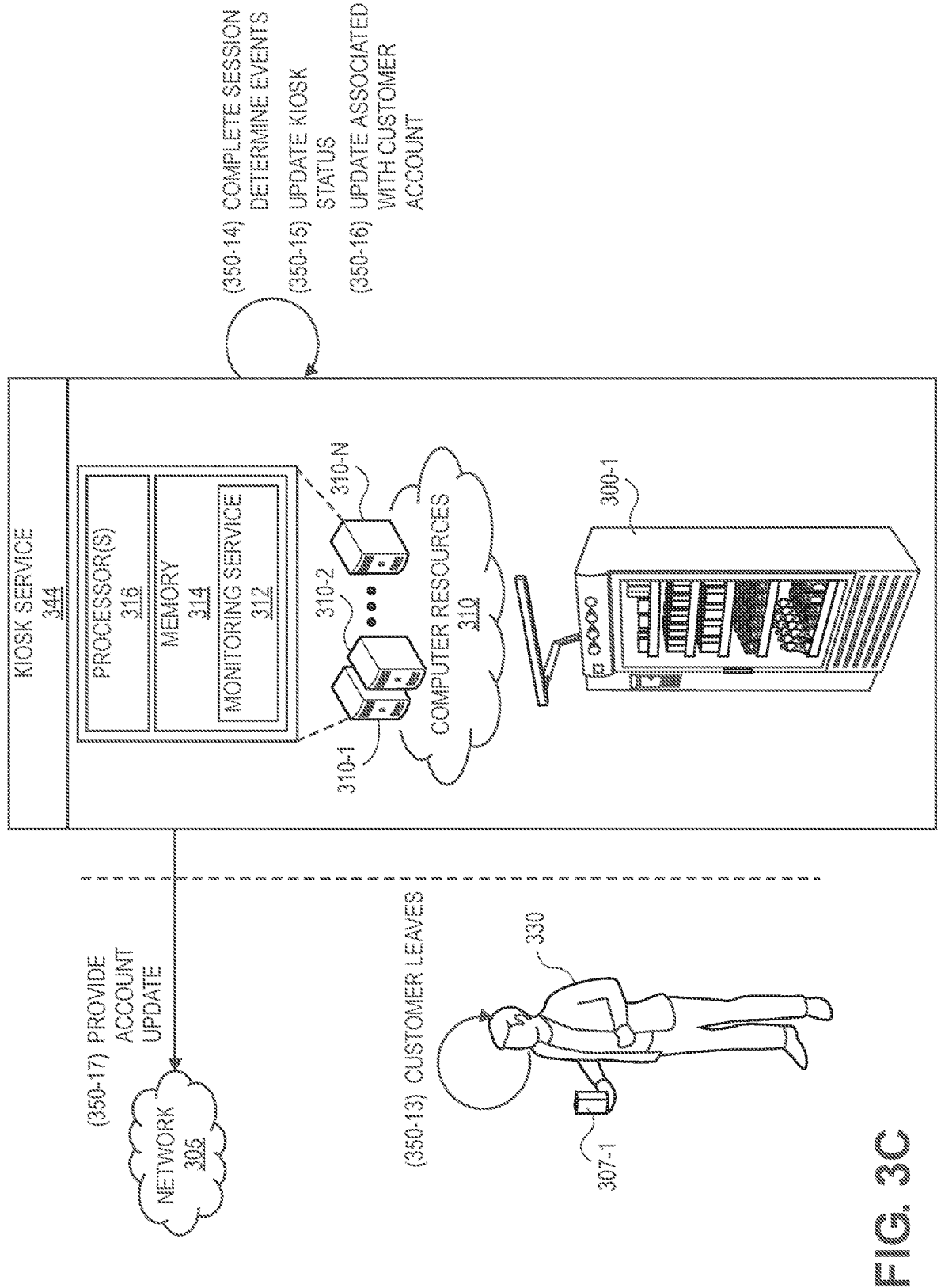

FIGS. 3A through 3C illustrate an example transition diagram of a customer 330 interacting with a kiosk, in accordance with described implementations. In general, the discussion presented with respect to FIGS. 3A through 3C is described from the perspective of the user in that many of the steps performed by the kiosk service 344 are described collectively, regardless of whether those steps are performed at a kiosk 300 or at one or more remote computer resources 310 in communication with a kiosk of the kiosk service 344.

The example discussed with respect to FIGS. 3A through 3C begins with a customer 330 accessing an application 322 executing on a portable device 320 in the possession of or associated with the customer to obtain an access identifier ("access ID"), also referred to herein as a unique identifier, that may be used by the customer 330 to gain access to an interior of a kiosk 300. In some examples, the access ID may be pre-stored in the application 322 of the user device. In other examples, the application 322 may send an access ID request to the kiosk service 344 via a network 305, such as the Internet and/or other network that enables communication between the application 322 executing on the device 320 and the kiosk service 344, as in 350-1. For example, the application 322 may send an access ID request that includes an identifier, such as a customer identifier, device identifier or other identifier that may be used by the kiosk service 344 to determine an account associated with the customer 330. In some implementations, the access ID request may be sent from the application 322 executing on the device 320 to one or more computer resources 310 that are remote from the kiosk 300.

As illustrated, the remote computer resources 310 may include one or more servers, such as servers 310-1, 310-2 through 310-N. These servers 310-1-310-N may be arranged in any number of ways, such as server farms, stacks, and the like that are commonly used in data centers. Furthermore, the servers 310-1-310-N may include one or more processors 316 and memory 314 which may store program instructions, such as the management service 312, and execute one or more of the processes or features discussed herein. Likewise, the portable device 320 may be any type of device such as a laptop, cell phone, table, wearable, etc., and may include one or more processors 326 and a memory 324 which may store program instructions, such as an application 322, and execute one or more of the processes or features discussed herein.

The kiosk service 344, upon receipt of the access ID request, generates an access ID for use by the customer to gain access to a kiosk 300 of the kiosk service, as in 350-2. The access ID, or unique identifier, may be any form of identifier that may be used by the kiosk service 344 to uniquely identify the customer 330 and/or an account of the customer 330. For example, the access ID may be a randomly generated number or series of numbers, characters, symbols, etc., that is associated with an account of the customer by the kiosk service 344 to link the account/customer to the access ID.

As will be appreciated, the kiosk service 344 may include any number of kiosks 300, such as kiosks 300-1, 300-2, through 300-N, that may be accessed by the same or different customers and that are managed by the management service 312 as part of the kiosk service 344. In some implementations, the access ID generated in response to an access ID request may be used by the customer to access any kiosk 300-1 through 300-N of the kiosk service 344. In other examples, the access ID may only allow access to a specific kiosk or specific number of kiosks. Still further, in some examples, the access ID may only be valid for a defined period of time (e.g., 3 hours, 1 day, etc.) and/or valid for a defined number of accesses (e.g., one access, two accesses, etc.). Once the access ID is no longer valid, the customer 330 may need to obtain a new access ID from the kiosk service 344 before further access to kiosks is available. Providing access IDs for a defined period of time/uses may increase security for both the kiosk service 344 and the customer 330.

Upon generation of the access ID, the kiosk service 344 provides the generated access ID, via the network 305, back to the application 322 executing on the device 320, as in 350-3.

While the above example describes the application 322 requesting an access ID from the kiosk service, the kiosk service 344 generating a requested access ID, and the kiosk service sending the generated access ID back to the application 322 for use by the application/customer to gain access to a kiosk, in other implementations, the access ID or unique identifier that is associated with the customer 330 or account of the customer may already be known to the kiosk service 344 and accessible by the customer. In general, the access ID may be anything that is usable by the kiosk service 344 to uniquely identify the customer 330 or an account associated with the customer. For example, the access ID may be or include, but is not limited to, a pass phrase or keyword that may be uttered by the customer 330, biometrics (e.g., fingerprints, palm scans, etc.) that may be provided by the customer, a passive tag (e.g., barcode) and/or active tag (e.g., RFID tag) that may be presented by the customer, a keyed input or series of keyed inputs that are provided by the customer, facial recognition of the customer using various forms of image processing of an image of the customer, audio signature recognition of the customer using audio processing techniques, a unique identifier of the device 320, etc.

Regardless of how the access ID is generated or obtained, when the customer approaches a kiosk 300, such as kiosk 300-1, the access ID is provided by the customer and/or the application 322 executing on the device 320 to the kiosk 300-1 of the kiosk service 344, as in 350-4. Prior to allowing access to the interior of the kiosk, the kiosk service verifies that the access ID is valid, as in 350-6.

In some implementations, validation of the access ID may include the kiosk 300-1 that received the access ID sending the received access ID to the management service 312 executing on the remote computer resources and the management service verifying that the access ID is valid and corresponds to an account and/or a customer. In other examples, an access ID database may be maintained at or accessible by the kiosks 300 and the kiosk 300-1 that received the access ID may query the database to verify that the access ID is valid. In still another example, the application 322 executing on the device 320, when presented or near a kiosk 300-1, may obtain an identifier of the kiosk 300-1 and provide the kiosk identifier and access ID corresponding to the customer/account to the remote computer resources 310, via the network 305 for verification. The management service executing at the remote computer resources may then verify the access ID and kiosk and provide an access granted notification back to kiosk 300-1 and/or the device 320 and the device may provide the access granted notification to the kiosk. Such an example configuration may be beneficial in instances when the kiosk does not have network access or is otherwise unable to communicate with the remote computer resources 310.

Turning now to FIG. 3B, upon verification of the access ID, a locking mechanism of the door of the kiosk is disengaged such that the door may be moved from a closed position to an open position, thereby providing the customer 330 with access to inventory items 307 contained within the housing of the kiosk 300-1, as in 350-7. In addition to disengaging the locking mechanism, a session may be initiated. A session, as discussed herein, may be a period of time between disengagement of the locking mechanism and a door close event in which it is detected that the door to the kiosk has been closed, thereby prohibiting access to items within the interior of the kiosk.

As discussed further below, during a session, weight sensor data from each of the plurality of weight sensors included in the interior of the kiosk 300 is recorded and image data generated by the imaging element(s) of the kiosk is recorded, as in 350-8 and 350-9.

Upon disengagement of the locking mechanism, the customer opens the door to the kiosk thereby providing the customer with access to each of the items contained within the interior of the kiosk, as in 350-10. Because the customer 330 has directed access to the inventory items contained within the kiosk, the user may interact with one or more of the items, as in 350-11. For example, the customer may pick one or more items from different shelves of the kiosks, place one or more items onto one or more shelves of the kiosk, etc. Each interaction with an item by the customer will result in weight sensor data changes indicative of the interactions (e.g., pick/place of an item) and image data representative of the customer picking or placing of the items. Rather than requiring selection and payment of an item included in the kiosk, like traditional systems, the weight sensor data and image data is recorded during the session and no fees or other charges are applied to the customer during the session. In the illustrated example, the customer 330 has picked an item 307-1 from the interior of the housing of the kiosk 300-1.

To complete a session, the customer closes the door, as in 350-12. At this point, the customer may simply move away from the kiosk 300-1 without having to perform any additional interaction or payment for items picked from the kiosk, such as item 307-1, as in 350-13 (FIG. 3C).

Referring to FIG. 3C, upon detection of the customer closing the door, a close door event, the session is completed and events are determined, as in 350-14. Event determination is discussed in further detail below and may be performed at the kiosk 300-1, at the remote computer resources 310, or at both the kiosk 300-1 and the remote computer resources 310. As discussed below, event determination identifies items the customer interacted with and ultimately picked from the kiosk and retained in the possession of the customer upon completion of the session (when the customer closed the door of the kiosk).

Based on the events determined for the session, the kiosk status is updated to account for any inventory picked by the customer from the kiosk (or any inventory placed by the customer into the kiosk, as in 350-15. In addition to updating the inventory status of the kiosk, if items were misplaced within the kiosk during the session and/or if misplaced items were returned to their proper areas within the kiosk, the status of shelves of the kiosk may be updated. For example, if the customer picks an item from a first area (e.g., a first shelf) and then returns the item to a second area that is different than the first area (e.g., a second shelf) that contains different item types of inventory items, the area at which the item was placed may be updated to indicate that the area includes mixed inventory item types. Likewise, if a customer picks an item that was already in the wrong place (e.g., on the wrong shelf with other inventory item types) and returns the item to a proper area within the kiosk, or retains the item upon completion of the session, the area from which the item was picked, provided it does not still contain other items of differing inventory item types, may be updated to indicate that the area again only has a single inventory item type.

In addition to updating the kiosk status, the account associated with the customer is also updated to indicate items that the customer picked from the kiosk and retained after completion of the session, such as item 307-1, as in 350-16. In some implementations, if the customer returns an inventory item into the kiosk during a session, the account of the customer may likewise be updated to account for the return. Updating of the customer account may include, but is not limited to, associating the inventory item type(s) of the inventory item(s) picked and retained by the customer, charging a fee to the customer for picked inventory items that were retained by the customer following completion of the session, etc. In some implementations, the customer account may also be updated to indicate other items with which the customer interacted but ultimately did not pick and retain from the kiosk. For example, if the customer picked an inventory item from a shelf of the kiosk and subsequently returned the inventory item to the shelf of the kiosk during the session, while the customer did not retain the item following completion of the session, the account of the customer may be updated to indicate the interaction with the item.

Finally, in addition to updating the account of the customer, in some implementations, a notification, such as an email, text message, etc., may be sent to the customer to indicate or verify to the customer the items picked from the kiosk and retained by the customer following completion of the session (or returned into the kiosk by the customer), as in 350-17.

FIGS. 4A through 4D illustrate an example kiosk process 400, in accordance with described implementations. While the example process 400 describes that certain features of the process 400 are performed at the kiosk and that certain other features are performed at the remote computer resources, in other implementations, features may be performed by other aspects of the kiosk service. For example, in some implementations, some or all of the features may be performed at the kiosk. In other examples, some of the features illustrated in FIGS. 4A through 4D as being performed by the kiosk may be performed at the remote computer resources.

The example process 400 begins with a kiosk receiving an access ID, for example from a customer or a device of the customer, and providing that access ID to the remote computer resources, as in 404 and 406. As discussed above, the access ID may be any of a variety of identifiers that may be used by the kiosk service to uniquely identify the customer and/or an account of the customer. For example, the access ID may be generated by the kiosk service, associated with an account of the customer, provided to an application executing on a device of the customer, and the kiosk may receive the access ID from that application executing on the device of the customer. In another example, the customer may provide the access ID by placing or positioning their hand, finger, etc., on or near a unique identifier sensor of the kiosk and the unique identifier sensor may detect the unique ID of the customer (e.g., customer biometrics). In still other examples, as a customer approaches the kiosk, one or more images of the customer may be obtained by an imaging element of the kiosk and those images may be processed, for example using facial recognition, to uniquely identify the customer.

Regardless of how or what type of access ID is provided by the kiosk and/or the remote computer resources, the remote computer resources determine if the access ID is valid, as in 408. For example, valid access IDs may be maintained in a data store accessible by the remote computer resources and the remote computer resources may query the data store to verify that the access ID is valid. Other validation techniques may also be utilized.

If it is determined that the access ID is not valid, an access denied notification may be sent from the remote computer resources to the kiosk and presented on a display of the kiosk to inform the customer that the access ID was not valid and that access to the kiosk cannot be provided, as in 409. In other implementations, the notification may be presented on a display of a customer device of the customer. In some implementations, the notification presented by the kiosk/device may request that the user obtain a new access ID, retry access, provide a different access ID, etc.

If it is determined at decision block 408 that the access ID is valid, a session for the customer's interaction with the kiosk is initiated, as in 410, and recording of weight sensor data and image data by each of the plurality of weight sensors within the kiosk and the imaging elements of the kiosk, respectively, is initiated, as in 411. Likewise, the door of the kiosk is unlocked, as in 412. For example, the kiosk upon receiving a notification that the access ID is valid, may initiate a session, start recording of weight sensor data and image data, and send an instruction that causes a locking mechanism of the door of the kiosk to disengage so that the door may be moved from a closed position, which prohibits customer access to inventory items contained within the housing of the kiosk, to an open position, which allows customer access to the inventory items contained within the housing of the kiosk.

Upon unlocking of the door, the example process may continually monitor for a door close event, indicative of the customer closing the door, thereby ending the customer's access to the inventory items contained within the housing of the kiosk, as in 414. Upon detection of a door close event, the door is locked, as in 415. For example, a second instruction may be sent that causes the locking mechanism to engage, thereby securing the door in the closed position. In addition, recording of the weight sensor data and the image data may be terminated, as in 416, and the session may be indicated as completed, as in 419.

Upon completion of a session, an event list determination process 500 is performed to generate an event list that indicates events that occurred at the kiosk during the session (e.g., item picks, item places). The event list determination process is discussed in further detail below with respect to FIGS. 5A through 5B.

Figure 4A:
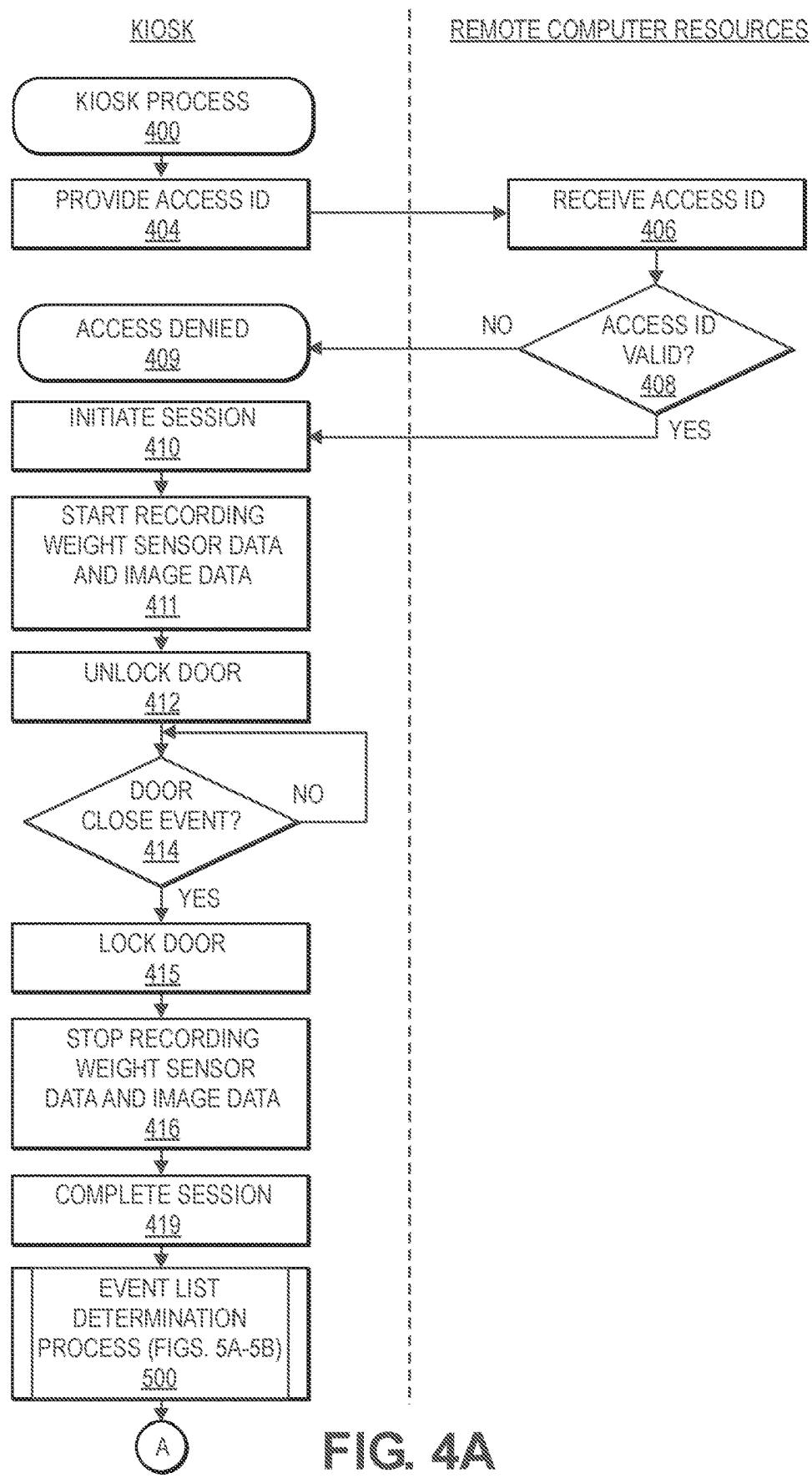
FIGS. 4A through 4D illustrate an example kiosk process, in accordance with described implementations.
Figure 4B:
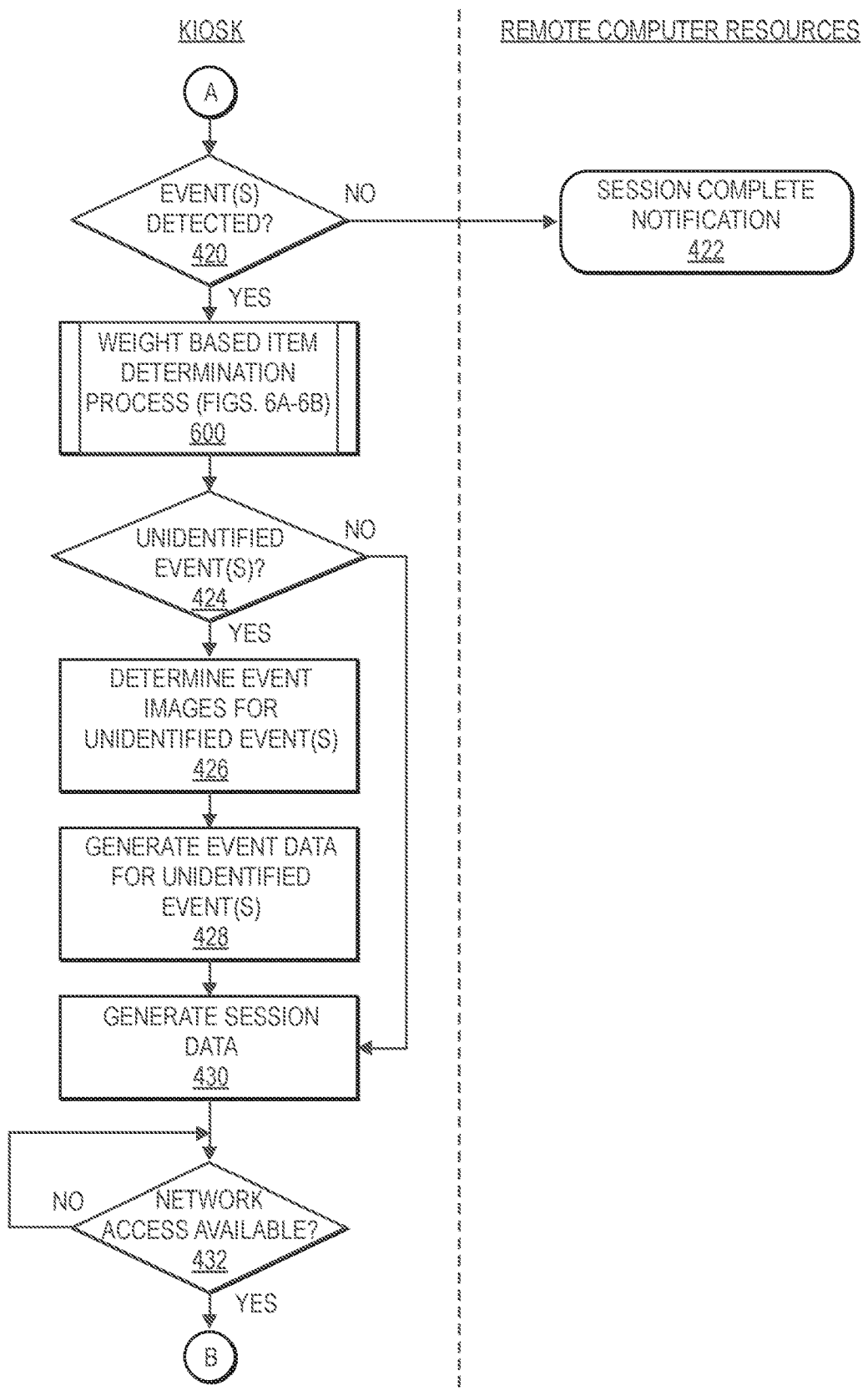

Upon completion of the event list determination process 500, and referring now to FIG. 4B, a determination is made as to whether an event occurred at the kiosk, as in 420. As will be appreciated, for some sessions it may be determined that no event occurred during the session. For example, a customer may initiate a session by opening a door to the kiosk and then decide not to pick any items within the kiosk or pick and return an item during the session. If it is determined that no events occurred during the session, a session complete notification is sent to the remote computer resources, as in 422. Alternatively, or in addition thereto, a notification may be sent to the customer to confirm to the customer that the session between the customer and the kiosk has completed and that no events occurred during the session. In another example, the remote computer resources, upon receipt of a session complete notification in which no events occurred, may send a notification to the customer to confirm to the customer that the session is complete and that no event occurred during the session.

If it is determined that one or more events were detected and indicated on the event list, a weight based item determination process 600 is performed in an effort to identify one or more items involved in each of the determined events. An example weight based item determination process is discussed further below with respect to FIGS. 6A through 6B. As discussed below with respect to FIGS. 6A through 6B, if the weight based item determination process is unable to identify the item(s) involved in an event, the event is indicated as an unidentified event and indicated on an unidentified event list that is returned from the example process 600 to the example process 400.

Upon completion of the example process 600, a determination is made as to whether any unidentified events are indicated on the unidentified event list returned from the example process 600, as in 424. If it is determined that one or more unidentified events remain, event images for each of the unidentified events are determined, as in 426. For example, images generated just prior to an occurrence of each unidentified event, images generating during each unidentified event, and/or images generated just following (post) the occurrence of the event may be determined as event images for each unidentified. For example, in some implementations, an event may be defined as a start time at which a weight change is initially detected by a weight sensor and a stop time at which the weight change detected by the weight sensor has stabilized. For example, if the weight sensors is generating three-hundred weight sensor readings per second, a start time of the event may begin when the weight sensor first detects a change in weight. For example, when a user grabs an item sitting on a shelf or tray and resting upon the weight sensor, the weight sensor may measure a change in a weight resulting from the change in pressure applied by the item to the sensor (e.g., an increase or decrease in weight resulting from the user grabbing the item), thereby indicating an event start time. The weight sensor data may then continue to change for a few seconds as the user grasps and ultimately picks the item from the area. Once the item has been completely removed from the area, the weight sensor readings will stabilize (i.e., stop changing), thereby indicating a stop time of the event. In such an example, images just prior to the start time of the event, images generated between the start time and stop time of the event, and/or images following the stop time of the event may be selected as event images for the event. Such image selection may be performed for each unidentified event indicated on the unidentified event list.

In addition, event data may be generated for each unidentified event, as in 428. Event data may include, but is not limited to, event images, weight changes determined for an event from weight sensor data, candidate items and/or potential items that may be the item(s) involved in the event, the event action, etc. As discussed further below, during the event list determination process 500, a weight change for the event and an event action (pick, place) of the event may be determined for each event. Likewise, as part of the weight based item determination process, one or more candidate items may be determined for an unidentified event. Likewise, during the image based item determination process, one or more potential items may be determined for an event that is to undergo a manual review. As used herein, candidate items and potential items both refer to indications of items that may be involved in an event. The only distinction between candidate items and potential items is the terminology used to distinguish between determination of the items as part of the weight based item identification process (candidate item) and determination of the items as part of the image based item identification process (potential items). As such, candidate items and potential items may be used herein interchangeably to reference one or more items that may have been involved in an event.

Returning to FIG. 4B, after generating event data for unidentified events or if it is determined at decision block 424 that there are no unidentified events indicated on the unidentified event list returned from the example process 500, session data for the session is generated, as in 430. Session data may include, but is not limited to, the unidentified event list, an item pick list (discussed below), information regarding completed events, event data, etc.

Upon generation of the session data, a determination is made as to whether network access is available, as in 432. If it is determined that network access is not available, the example process 400 may remain at decision block 432 until network access becomes available. In some implementations, while the network is unavailable and/or at any other point during the example process 400 following completion of a session, the example process 400 may be restarted at a kiosk. For example, upon completion of a session by a customer, if the kiosk receives a second access ID from a different customer (or the same or different access ID from the same customer), another instance of the example process 400 may begin and a new session established corresponding to that second access ID and access to the kiosk established. Such additional session establishment may begin even though the example process 400 has not yet completed for the initial session.

Figure 4C:
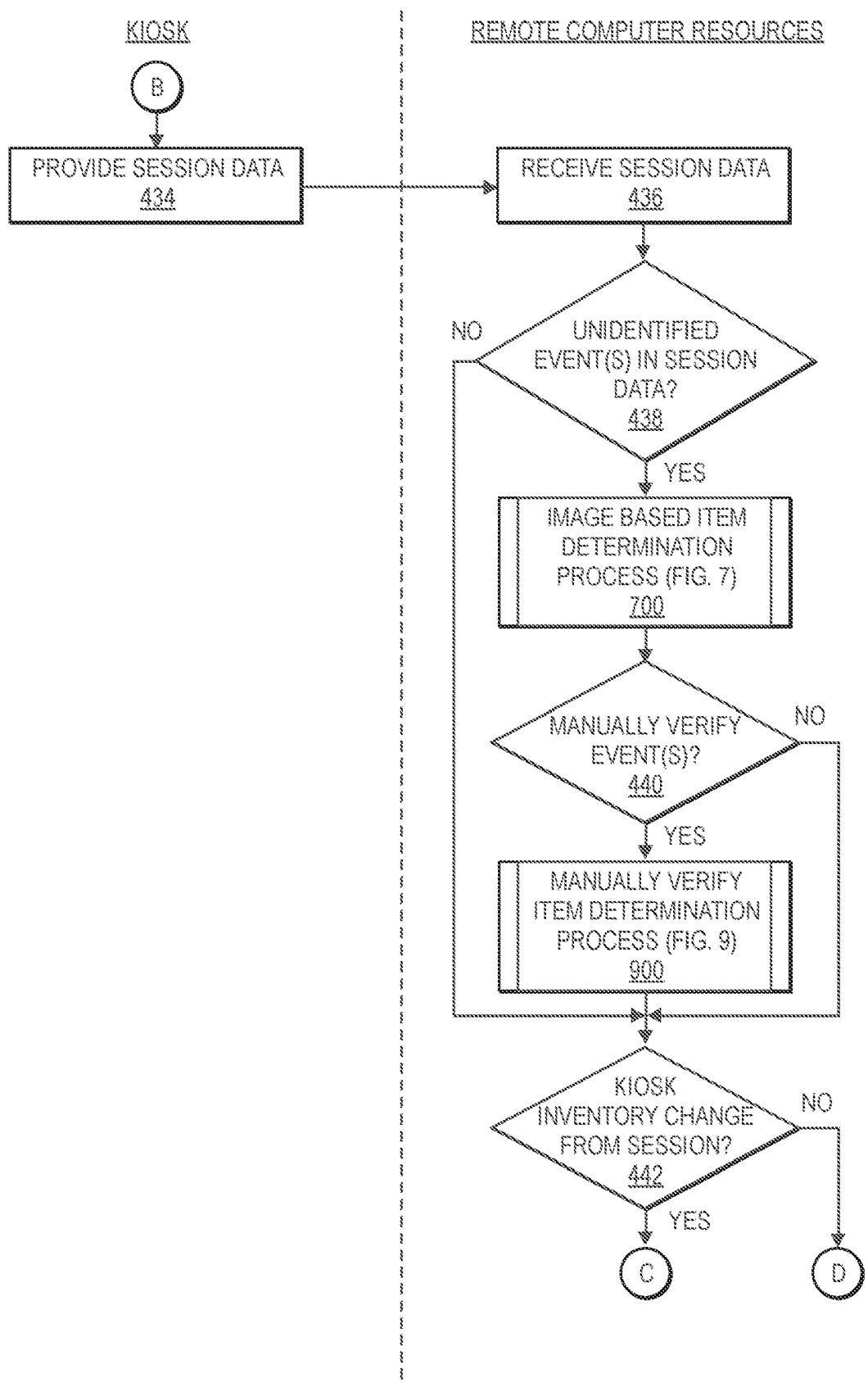

Referring to FIG. 4C, upon determination that a network is accessible at decision block 432, the session data is provided from the kiosk to the remote computer resources, as in 434 and 436. The remote computer resources, upon receipt of the session data, determines if one or more unidentified events are indicated in an unidentified events list included in the session data, as in 438.

If it is determined that one or more unidentified events are indicated in the unidentified events list, the image based item determination process 700 is performed. An example image based item determination process is discussed in further detail below with respect to FIG. 7.

Upon completion of the image based item determination process 700, a determination is made as to whether any events are indicated on the manual review event list that are to be manually verified, as in 440. As discussed below, if an action of an event or an item involved in the event cannot be verified by the weight based item determination process 600 or the image based item determination process 700, the event is indicated on a manually verify events list.

If it is determined that one or more events are indicated on the manually verify event list, the manually verify item determination process 900 is performed. An example manually verify item determination process is discussed further below with respect to FIG. 9.

Upon completion of the manually verify item determination process 900, if it is determined at decision block 440 that no events were indicated in the manually verify events list, or if it is determined at decision block 438 that no unidentified events were included in the unidentified event list, a determination is made as to whether an inventory change occurred during the session, as in 442. For example, the completed events may be compared, along with the item pick list, to determine if one or more items were picked from the kiosk during a session and retained by the customer following completion of the session. If one or more items are determined to have been picked and retained by the customer following completion of the event, it may be determined that an inventory change occurred during the session. In comparison, if a pick of a first item occurred during the session and a subsequent place of that same first item also occurred during the session, it may be determined that an inventory change did not occur for that time, because the two events cancel out and the item remains in the kiosk following the session. As another example, if the kiosk accepts returns and it is determined that a customer has placed a new item into the kiosk, it may be determined that an inventory change occurred during the session.

Figure 4D:
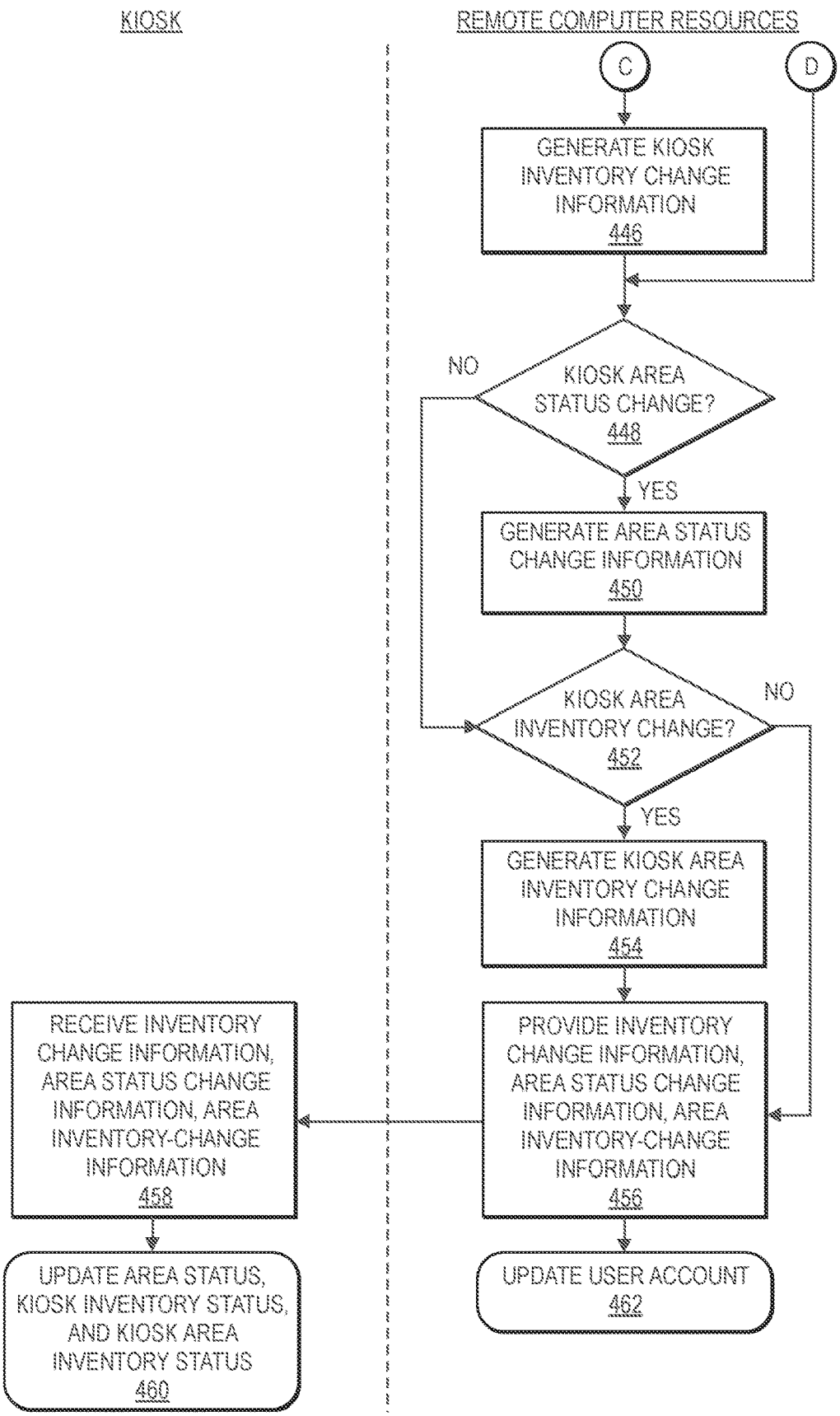

If it is determined that an inventory change did occur during the session, kiosk inventory change information is generated, as in 446 (FIG. 4D). After generating the inventory change information, or if it is determined at decision block 442 that an inventory change did not occur, a determination is made as to whether a kiosk area status change occurred during the session, as in 448. Independent of whether an inventory change occurred, a kiosk area status change may occur during a session. For example, and as discussed above, a kiosk may be segmented into a plurality of areas, with each area associated with a single weight sensor, a single inventory item type, and configured to store one or more items of that item type. For example, each area may include a permanent or removable tray onto which items of a same item type are intended to be stored and available to customers of the kiosk. However, because a customer of the kiosk has access to multiple items during a session, the customer may pick an item of a first item type from a first area within the kiosk but then place that same item at a second area within the kiosk, such as a second area that is associated with and intended to hold inventory items of a second item type that is different than the first item type. In such an example, the status of the second area may change from a single inventory item type status to a mixed inventory item type status.

After generating area status information at block 450, or if it is determined at decision block 448 that an area status did not change during the session, it may also be determined if a kiosk area inventory change for an area within the kiosk occurred during the session, as in 452. In many instances, the area inventory change may correspond to a kiosk inventory change, for example when a user picks and retains an item, both the kiosk inventory and the kiosk area inventory will change. However, in some instances the area inventory of one or more areas within the kiosk may change without the overall kiosk inventory changing. For example, if, as discussed above, a customer picks a first item from a first area and then places that same item into a second area during a session, the area inventory for both the first area and the second area will change even though the overall kiosk inventory remains unchanged with respect to those events and the session. In particular, the area inventory for the first area will be decremented to reflect the pick of that item from the first area and the area inventory for the second area will be incremented to reflect the place of that item at the second area. If, as discussed above, the item type of the item and the item type associated with the area are different, such a movement of the item will result in both the area status of the second area changing and the area inventory for the second area changing. In comparison, if the item type of the inventory item placed into the second area is the same as the item type associated with the second area (e.g., both the first area and the second area are associated with the same item type), while the area inventory for both the first area and the second area will be updated in response to the movement of the item from the first area to the second area, the status of the two areas will remain unchanged in response to those events.

As still another example, a first area may have a mixed item status resulting from an item of a first item type being placed in the first area during a first session if the first area is associated with a second item type that is different than the first item type. If, during a second session, a customer picks the first item from the first area and places the item into a second area that is associated with the first item type, such events of a movement of the item may result in both the area inventory for the first area being decremented and the area inventory for the second area being incremented, as well as the status of the first area changing from a mixed status back to a single item type status, provided there are no other items in the first area that have an item type other than the second item type associated with the first area.

If it is determined at decision block 452 that there is a kiosk area inventory change, kiosk area inventory change information is generated, as in 454. As discussed, the kiosk area inventory change information may indicate, for one or more areas, if the area has changed from a single inventory item type to a mixed inventory item type or from a mixed inventory item type to a single inventory item type.

After generating kiosk area inventory change information or if it is determined at decision block 452 that no kiosk area inventory changes occurred, inventory change information, area status change information, and/or kiosk area inventory change information may be provided from the remote computer resources to the kiosk, as in 456 and 458. While the above example indicates that inventory change information, area status information, and area inventory change information are sent from the remote computer resources to the kiosk, in other implementations, inventory change information, area status information, and/or inventory area change information that can be determined from aspects of the example process 400 performed on the kiosk may be determined at the kiosk and provided to the computer resources as part of the process 400.

Finally, the example process 400 may also update the account associated with the customer identified for the session to indicate any inventory items picked and retrieved by the customer and/or other events/actions performed by the customer during the session, as in 462. Likewise, the area status, kiosk inventory, and/or kiosk area inventory maintained at the kiosk may also be updated, as in 460. As discussed further below, as all events determined for a session are processed and considered collectively it will be determined which items a customer picked and ultimately retained after completion of the session. In particular, items still indicated on the item pick list after all events have been processed correspond to items picked and retained by the customer after completion of the session. In comparison, items picked during the session and subsequently placed back into the kiosk will be removed from the item pick list and therefor will not result in the customer being charged for those items.

Figure 5A:
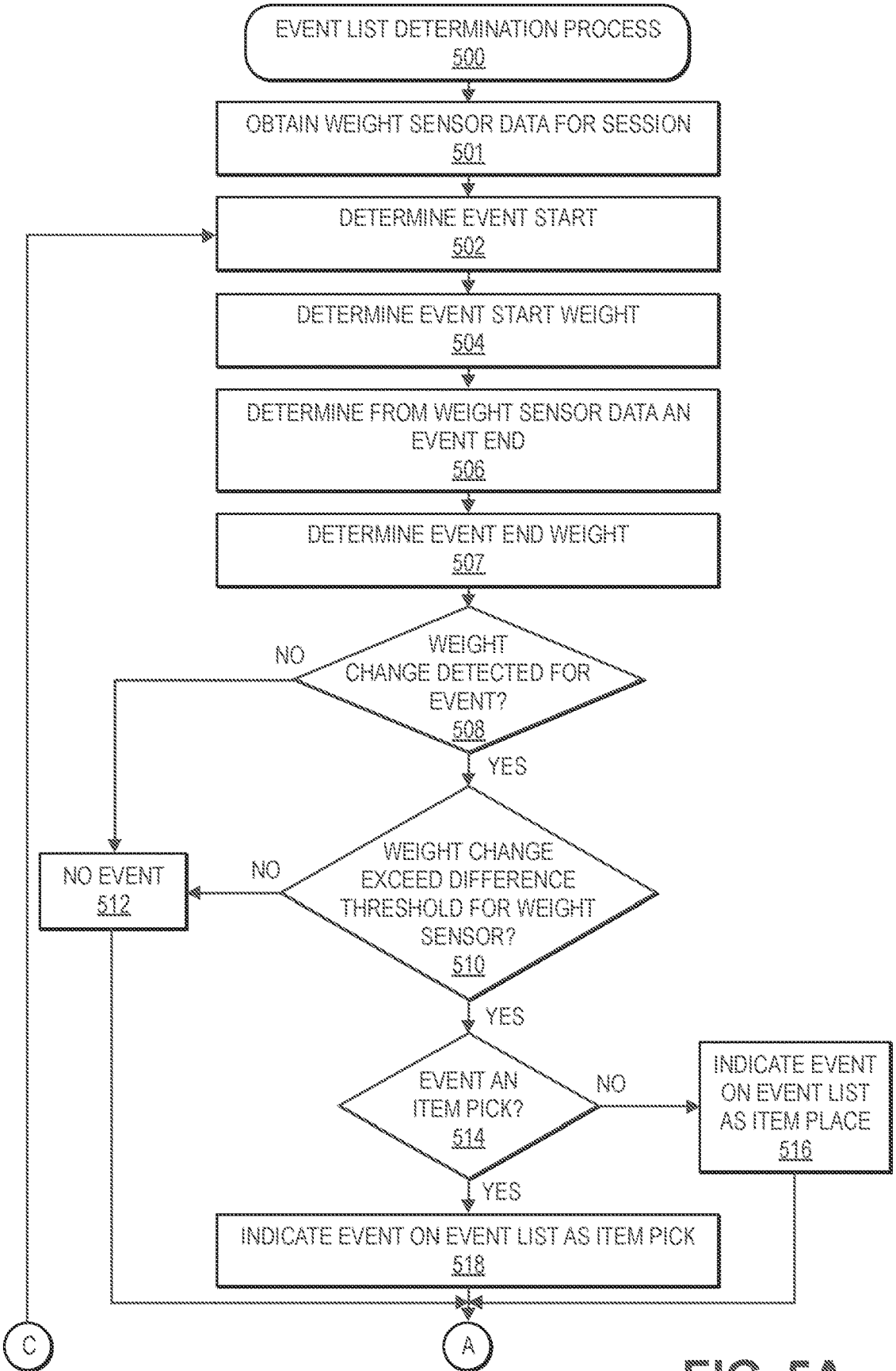
FIGS. 5A through 5B illustrate an example event list determination process, in accordance with described implementations.
Figure 5B:
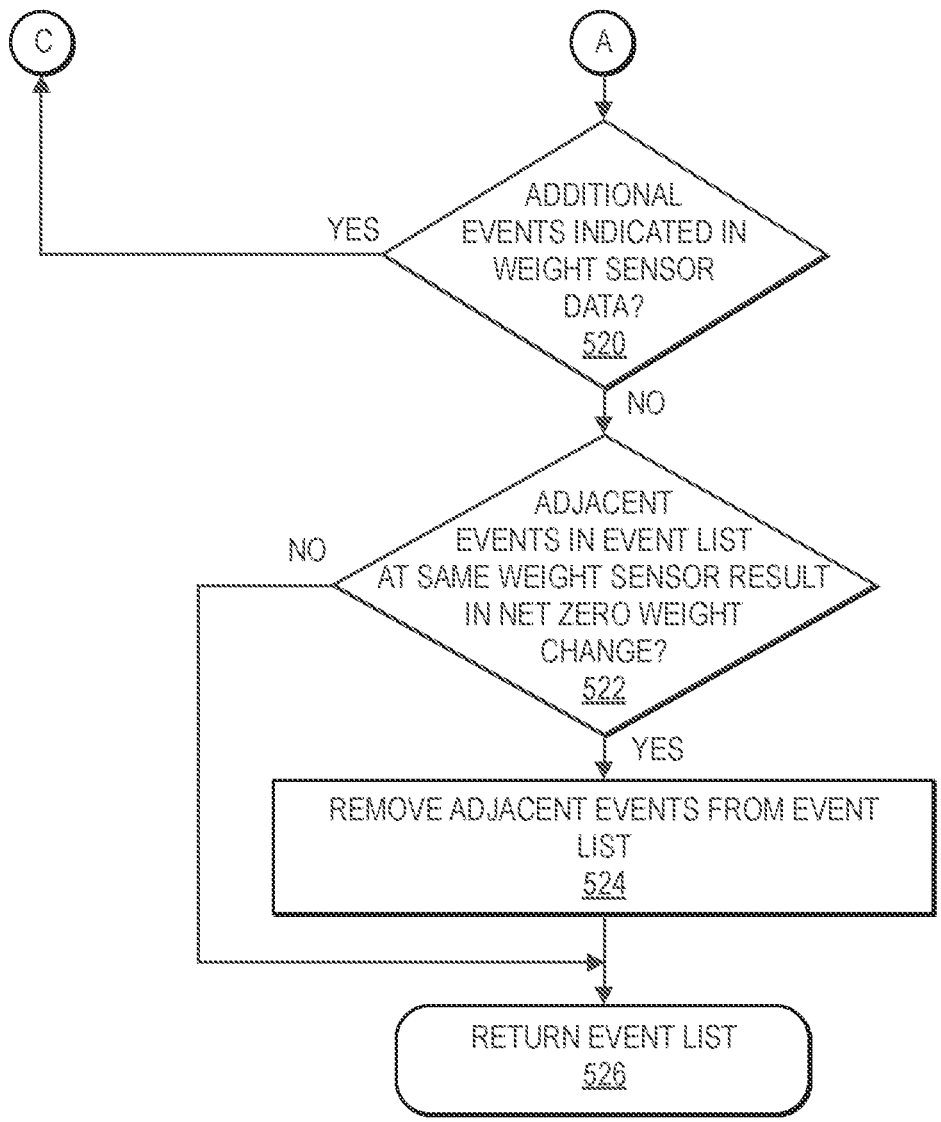

FIGS. 5A through 5B illustrate an example event list determination process 500, in accordance with described implementations.

The example process 500 begins by obtaining weight sensor data recorded by each of the plurality of weight sensors of a kiosk during a session at the kiosk, as in 501.

The obtained weight sensor data is then processed to determine an event start, which is indicated by a change in a weight sensor data recorded by a weight sensor during the session, as in 502. As discussed above, each weight sensor may generate weight sensor data during a session. Each weight sensor data generated during the session may be compared with a previous weight sensor data to determine if a change in the weight sensor data has been detected. A detected weight change may be indicative of an event. In some implementations, a change in weight sensor data may be any measurable change (e.g., one gram or more). In other implementations, a change in weight sensor data may only be detected if the change exceeds a threshold, e.g., three grams.

Upon detection of an event start, a weight at the weight sensor just prior to the event start is obtained and utilized as the event start weight, as in 504. The weight sensor data is further processed to determine an event end of the event, as in 506. As discussed above, upon occurrence of an event, such as an item pick or an item place, the measured weight sensor data will vary between adjacent weight sensor data readings until the event is complete (e.g., the item is finally removed from the area or placed and released at the area) and the weight sensor data stabilizes. Stabilization of weight sensor data may be determined, for example, in response a defined number of weight sensor data readings remaining unchanged following an event start. Stabilization of weight sensor data readings for a defined number of readings (e.g., twenty) may be indicative of an event end. Upon determination of an event end, an event end weight is determined as the weight measured at the weight sensor at the event end, as in 507.

The event start weight and the event end weight may then be compared to determine if any weight change is detected, as in 508. If the event start weight and the event end weight match, it may be determined that no event occurred, as in 512. Such a determination may result from vibrations (e.g., cars passing by the kiosk, earthquakes, high winds, etc.) imparted upon the kiosk that cause temporary changes in weight sensor data readings. However, if any weight change is detected between the event start weight and the event end weight, a determination is made as to whether the weight change exceeds a difference threshold for the weight sensor, as in 510.

The difference threshold may be any minimum weight change between an event start weight and an event stop weight (discussed below) that must be exceeded before an event is determined. In some implementations, the difference threshold may vary for different weight sensors of a kiosk. For example, a first weight sensor associated with a first item type having a first average item weight may have a difference threshold that is different than a second weight sensor associated with a second item type having a second average item weight that is different than the first average item weight. For example, if the first average item weight is 47 grams (e.g., average weight for a pack of gum) and the second average item weight is 382 grams (e.g., average weight for a 12 ounce can of soda), the difference threshold for the two different weight sensors may be different. For example, the difference threshold for the first weight sensor that is associated with the first item type may need to be much lower (e.g., two grams) than the difference threshold for the second weight sensor, which could be set much higher (e.g., 10 grams) because of the difference in the average item weights between the two item types. In other implementations, the difference threshold may be the same for all weight sensors of a kiosk. In still other examples, the difference threshold may be zero for some or all of the weight sensors of a kiosk, resulting in any change in weight between an event start weight and an event end weight resulting in a determination of an event.

If it is determined that the weight change does not exceed the difference threshold for the weight sensor, it is determined that no event occurred, as in 512. Such a change may be indicative of dust or other small debris being deposited at the area of the weight sensor. If it is determined that the weight change does exceed the difference threshold, an event is defined and a determination is made as to whether the event is an item pick, as in 514. An item pick may be determined if the event start weight is greater than the event end weight. If it is determined that the event was not an item pick, the event is indicated on the event list as an item place, as in 516. If it is determined that the event is an item pick, the event is indicated on the event list as an item pick, as in 518.

Turning now to FIG. 5B, after indicating the event on the event list (block 516 or 518), or after determining that an event did not occur (block 512), a determination is made as to whether additional events are indicated in the weight sensor data, as in 520 (FIG. 5B). If it is determined that additional events are indicated in the weight sensor data, the example process 500 returns to block 502 (FIG. 5A) and continues. However, if it is determined that no additional events are indicated in the weight sensor data, a determination may be made as to whether events indicated in the event list that are from the same weight sensor and adjacent in time result in a net zero weight change, as in 522. For example, if a customer picks in item from an area of a sensor, a first event at a first time, and then places the same item back into the area of the sensor, a second event at a second time, it may be determined that those two events, are from the same weight sensor, adjacent in time, and result in a net zero weight change. If it is determined that two events from a same weight sensor that are adjacent in time and result in a net zero weight change, the adjacent events may be removed from the event list, as in 524.

Finally, after removing any adjacent events from a same sensor that result in a net zero weight change, or if it is determined at decision block 522 that there are no two events on the event list from the same weight sensor that are adjacent in time and result in a net zero weight change, the event list is returned and the example process 500 completes, as in 526.

The event list generated and returned by the example process 500 may indicate, for each event on the event list, a weight sensor at which the event was detected, an event start time, an event end time, an event start weight, an event end weight, an event weight change, and/or an event action (e.g., pick, place).

Figure 6A:
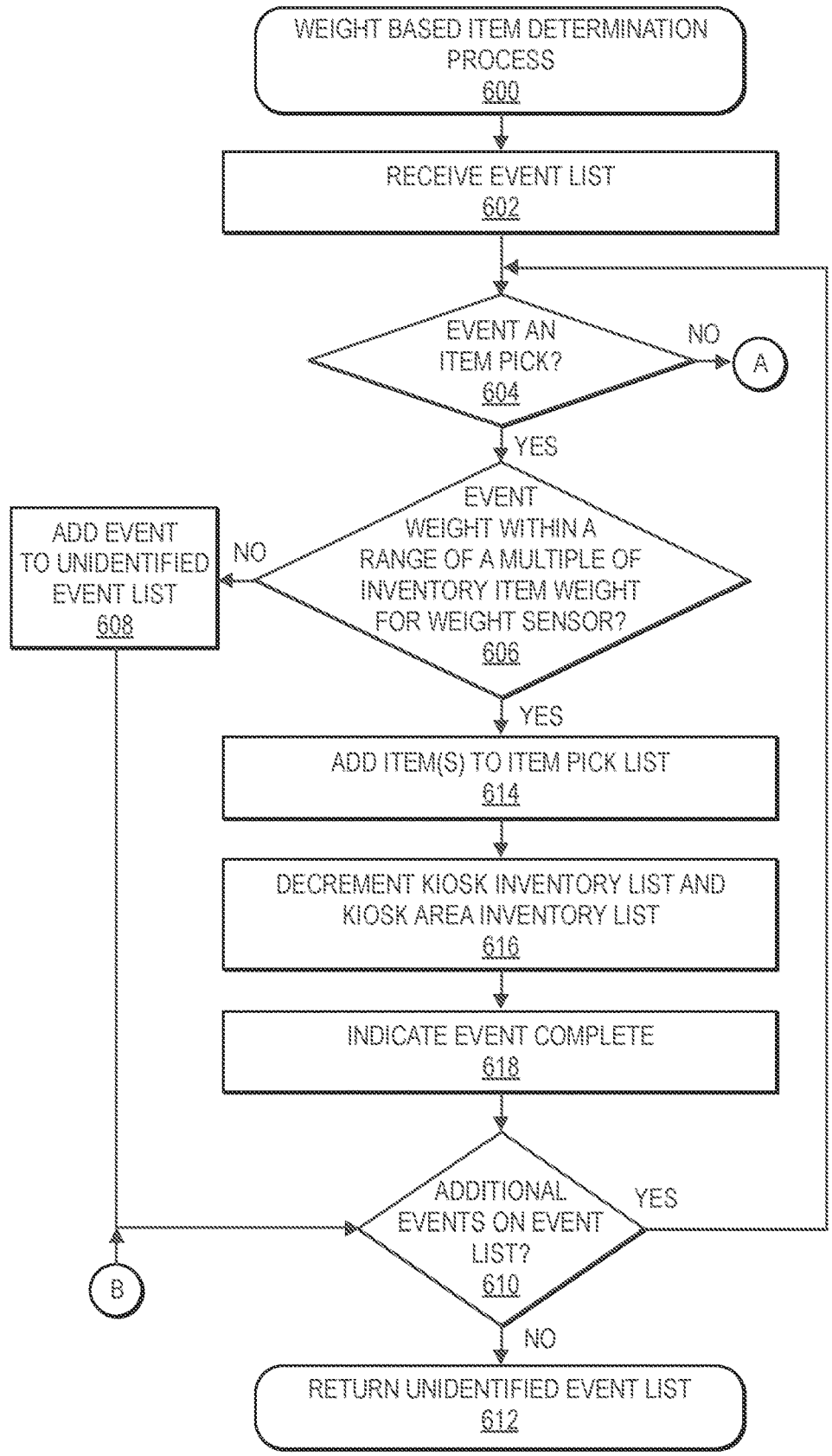
FIGS. 6A through 6B illustrate an example weight based item determination process, in accordance with described implementations.
Figure 6B:
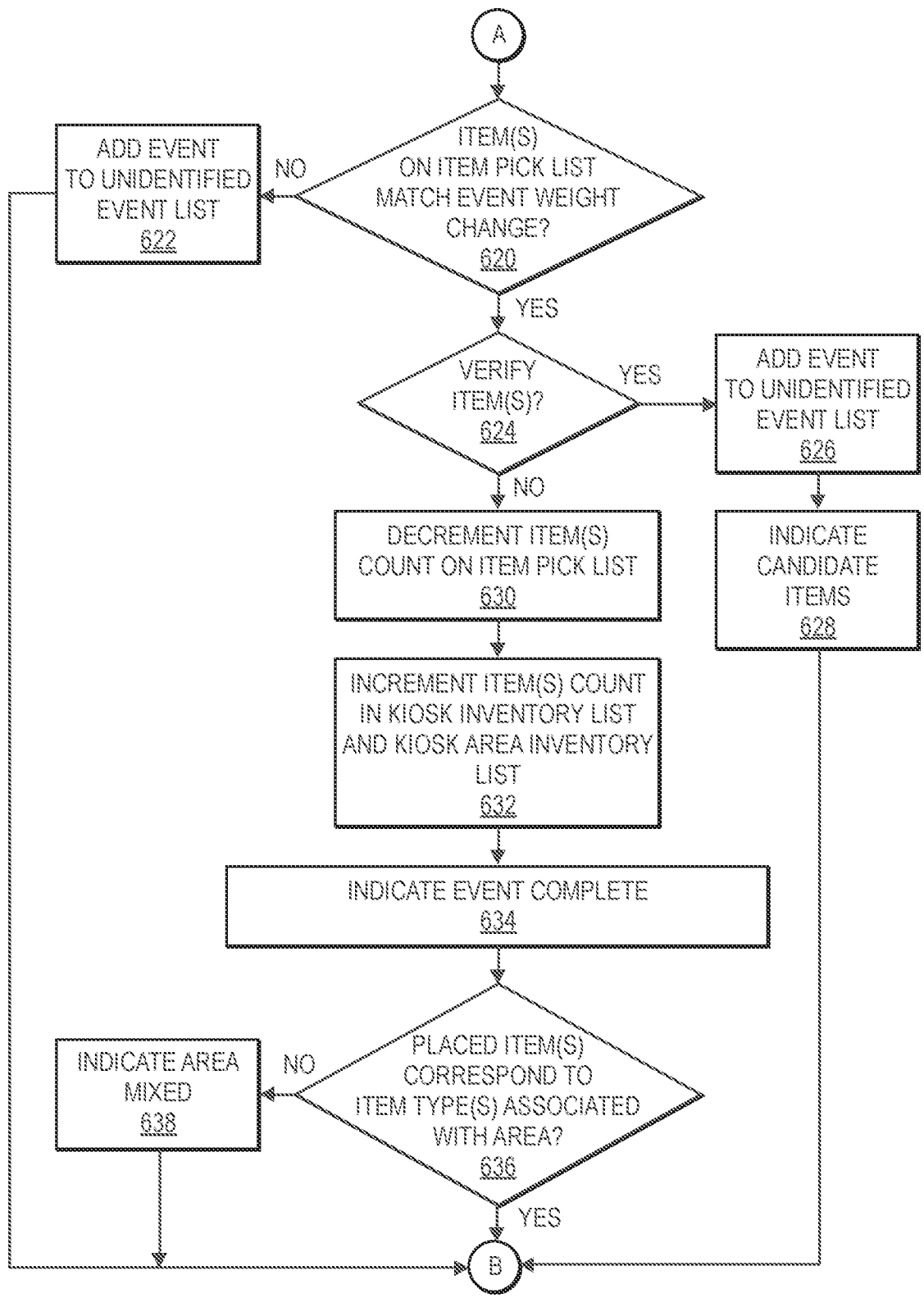

FIGS. 6A through 6B illustrate an example weight based item determination process 600, in accordance with described implementations.

The example process 600 begins upon receipt of the event list generated from the example process 500, discussed above, as in 602.

Upon receipt of the event list, a determination is made as to whether a first or next event on the event list is an item pick, as in 604. If it is determined that the event is an item pick, a determination is made as to whether the event weight change for the event is within a range of a multiple of the average inventory item weight associated with the weight sensor at which the event was detected, as in 606. As discussed above, in some implementations, each area and corresponding weight sensor may be associated with a single inventory item type and an average inventory weight may be maintained for that item type. In other implementations, an area and corresponding weight sensor may be associated with multiple different item types, with each item type having a corresponding average item weight. Likewise, each item type may have a range (e.g., variability, deviation, etc.) within which individual items of the item type may weigh. In some implementations, the range of acceptable weights for an item type may be different for different item types. For example, soda cans from producer A (an item type) may be very uniform in weight and thus have a small range around the average item weight. In comparison, small bags of chips from producer B (an item type) may have a large variability in individual weights (large deviation from the mean) and as a result may have a larger range.

If it is determined that the event weight change is not within a range of a multiple of the average inventory weight associated with the weight sensor, the event is added to an unidentified event list, indicating that the item involved in the event cannot be determined from the weight sensor data without additional processing, as in 608.

If it is determined that that event weight change is within a range of a multiple of the average inventory item weight associated with the weight sensor, the item type having the average inventory item weight and associated with the weight sensor is added to an item pick list or a count of that item type is incremented on the item pick list associated with the customer and/or the session, as in 614. Item types indicated on the item pick list are indicative of items picked from the kiosk during the session. An item pick list may identify, among other information, one or more of, a count of items of each item type determined to have been picked from a kiosk during a session, the weight of each of those items, as determined based on the event weight change when the item was picked, the area from which the item was picked, etc.

For example, if it is determined that the event weight change is within a range of a multiple of item type A, item type A may be added to the item pick list, or a count of items of item type A indicated on the item pick list may be incremented in accordance with the multiple. For example, if it is determined that the event weight change is a single multiple of the average inventory weight maintained for item type A, the item pick list is updated to indicate that one item of item type A has been picked from the kiosk during the session. As another example, if the multiple is two, the item pick list is updated to indicate that two items of item type A have been picked from the kiosk during the session.

In addition to adding the item type and count to the item pick list, the kiosk inventory list and the kiosk area inventory list for the area from which the item(s) were picked are decremented to reflect the pick of the item(s) from the kiosk, as in 616. In addition to updating the inventory lists, the event may be indicated as complete because both the event action (an item pick) and the item(s) involved in the event have been determined, as in 618.

After completing the event, or if the event is added to the unidentified event list in block 608, a determination is made as to whether additional events are indicated on the event list, as in 610. If it is determined that additional events are indicated on the event list, the example process 600 returns to block 604 and continues. If it is determined that there are no additional events indicated on the event list, the unidentified event list is returned and the example process 600 completes, as in 612.

Returning to decision block 604, if it is determined that the event is not an item pick (i.e., the event is an item place), a determination is made as to whether a weight of an item or combination of items indicated on the item pick list match the event weight change determined for the event, as in 620 (FIG. 6B). If it is determined that the event weight change does not match a weight of an item or combination of items on the event pick list, the event is added to the unidentified event list, as in 622. In some implementations, the event weight change and the item weight of an item or combination of items indicated on the item pick list must match exactly before it is determined that the item weights match. In other implementations, the event weight change and the item weight of an item or combination of items indicated on the item pick list must be within a defined range (e.g., 1 gram) before they are determined to match in weight.

If it is determined that the event weight change does match a weight of an item or combination of items indicated on the item pick list, a determination is made as to whether a verification is to be made with respect to the item involved in the event and the item(s) indicated on the item pick list as having the same item weights as the event item weight, as in 624. If it is determined that the item(s) are to be verified, the event is added to the unidentified event list, as in 626, and candidate items for the event may also be indicated, as in 628. In particular, the candidate items may be the item or combination of items indicated on the item pick list as having the same weight as the event weight change.

Returning to decision block 624, if it is determined that the item(s) are not to be verified, the item count for the item or combination of items is decremented on the item pick list to reflect the place of the item or combination of items to an area within the kiosk, as in 630. Likewise, the item count for the item or combination of items is incremented on both the kiosk inventory list and the kiosk area inventory list to reflect the place of the item(s) at the area within the kiosk, as in 632. In addition, the event may be indicated as complete, as in 634.

After updating the inventory lists, a determination is made as to whether the item(s) determined to be placed at the area within the kiosk correspond to the item type or item types associated with the area, as in 636. If it is determined that the item(s) determined to be placed at the area within the kiosk do not correspond to the item type(s) associated with the area, the area status is updated to indicate that the area has mixed inventory item types, as in 638.

Finally, after indicating the status of the area as mixed (block 638), after adding the event to the unidentified event list (block 622), after indicating one or more candidate items (block 628), or if it is determined at decision block 636 that the item type of the item(s) determined to have been placed at the inventory area correspond to the item type(s) associated with the inventory area, the example process 600 returns to decision block 610 (FIG. 6A) and continues, as discussed above.

Figure 7A:
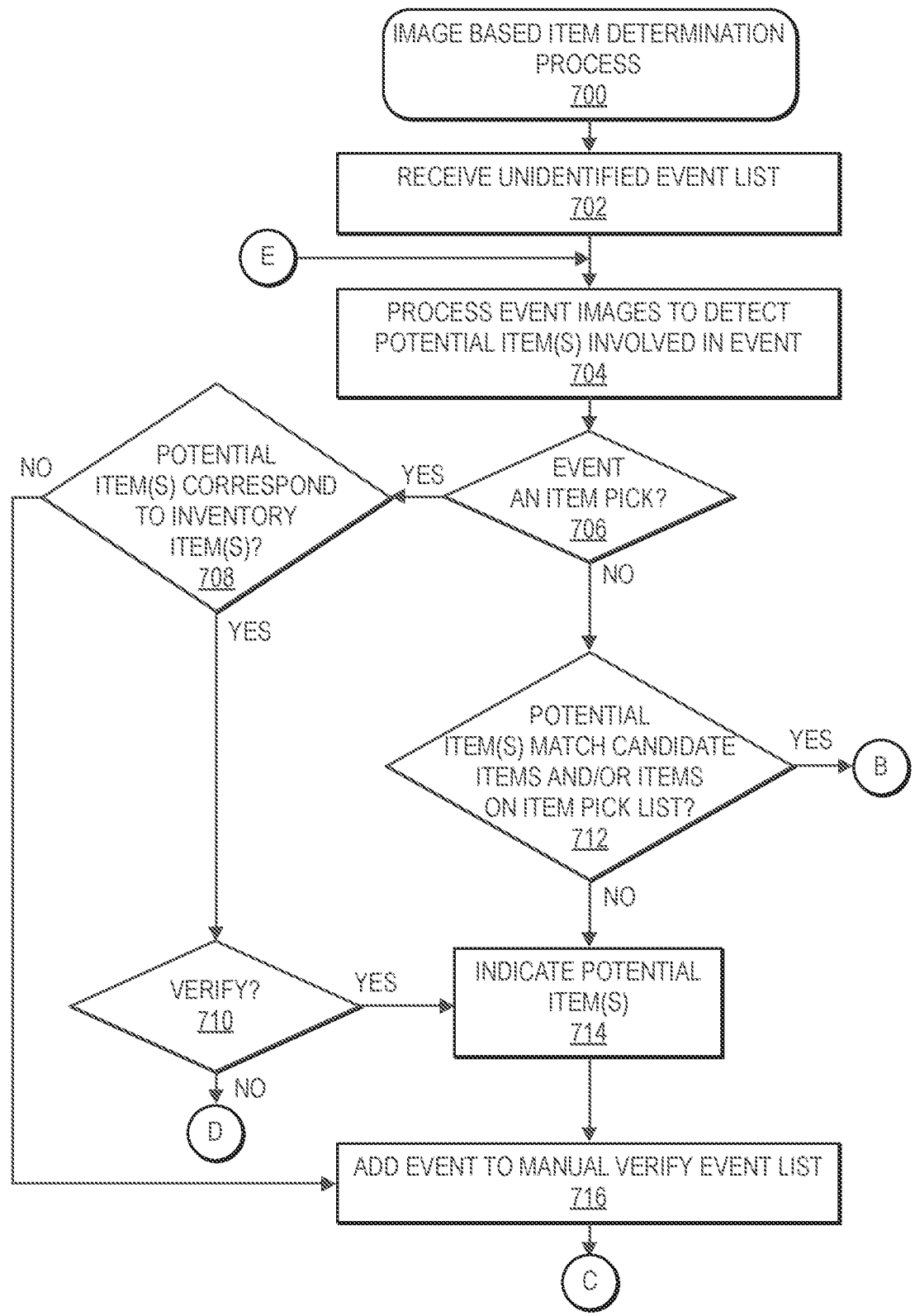
FIGS. 7A through 7B illustrate an example image based item determination process, in accordance with described implementations.
Figure 7B:
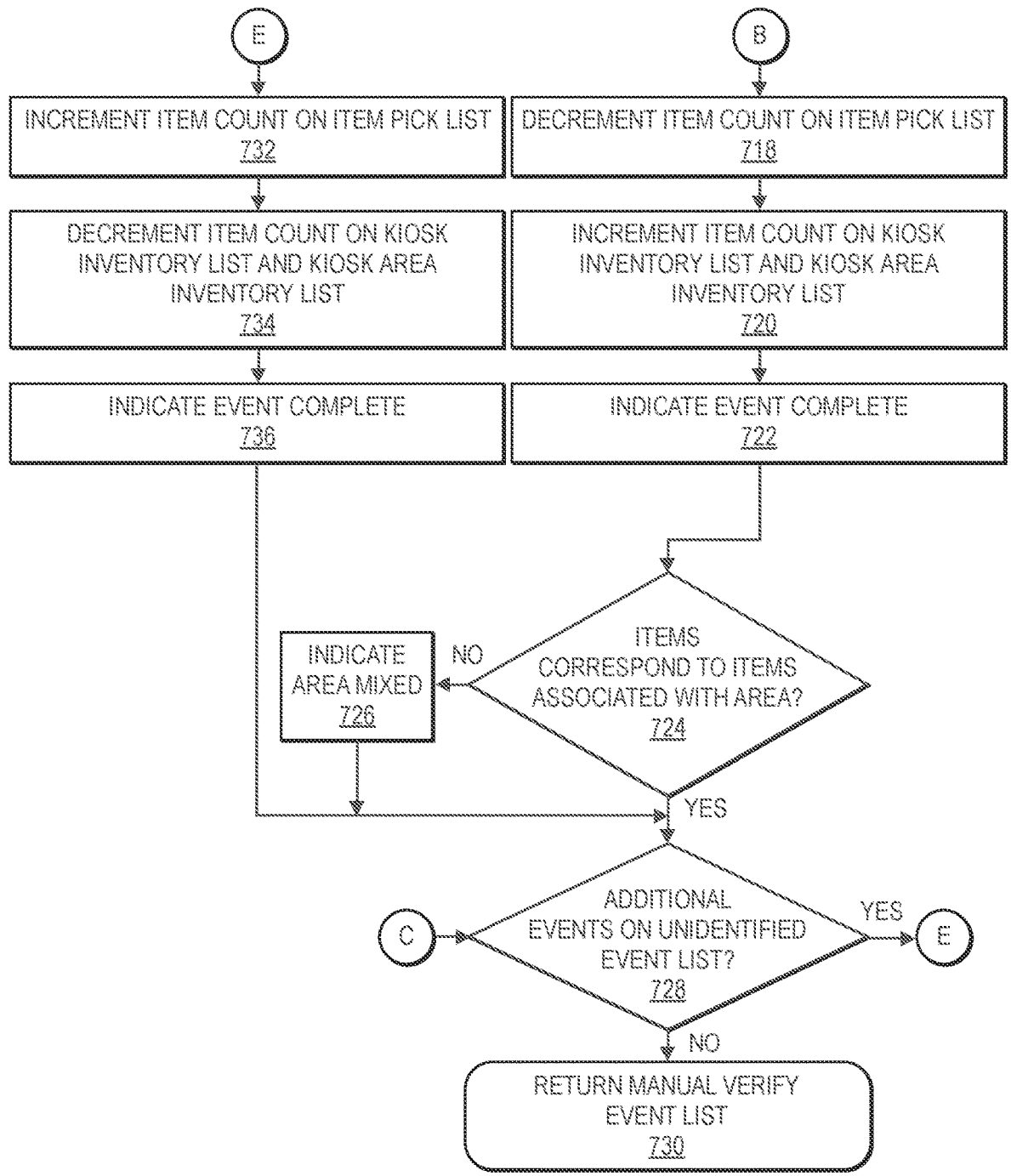

FIGS. 7A through 7B illustrate an example image based item determination process 700, in accordance with described implementations.

The example process 700 may be performed with respect to events that were not able to be completely determined through the weight based item determination process 600, discussed above. Accordingly, the image based item determination process begins upon receipt of an unidentified event list generated by the weight based item determination process, as in 702.

For a first or next event indicated in the unidentified event list, event images are processed to detect potential items involved in the event, as in 704. Image processing may use any of a variety of image processing techniques including, but not limited to, object detection, edge detection, gray scale image analysis, etc. In some implementations, because the inventory items contained in the kiosk are known, one or more image processing techniques may be performed that attempt to match an object detected in one or more event images with a stored image of an object known to be contained within the kiosk. In some examples, a machine learning model may be trained using input images of inventory items contained within the kiosk and the one or more event images of an unidentified event may be processed by the trained machine learning model in an effort to identify an item involved in the event. Additionally, as discussed further below, feedback from the manual verify item determination process (FIG. 9) may be used to continue training and improving the item recognition of an example machine learning model that processes event images.

Figure 8A:
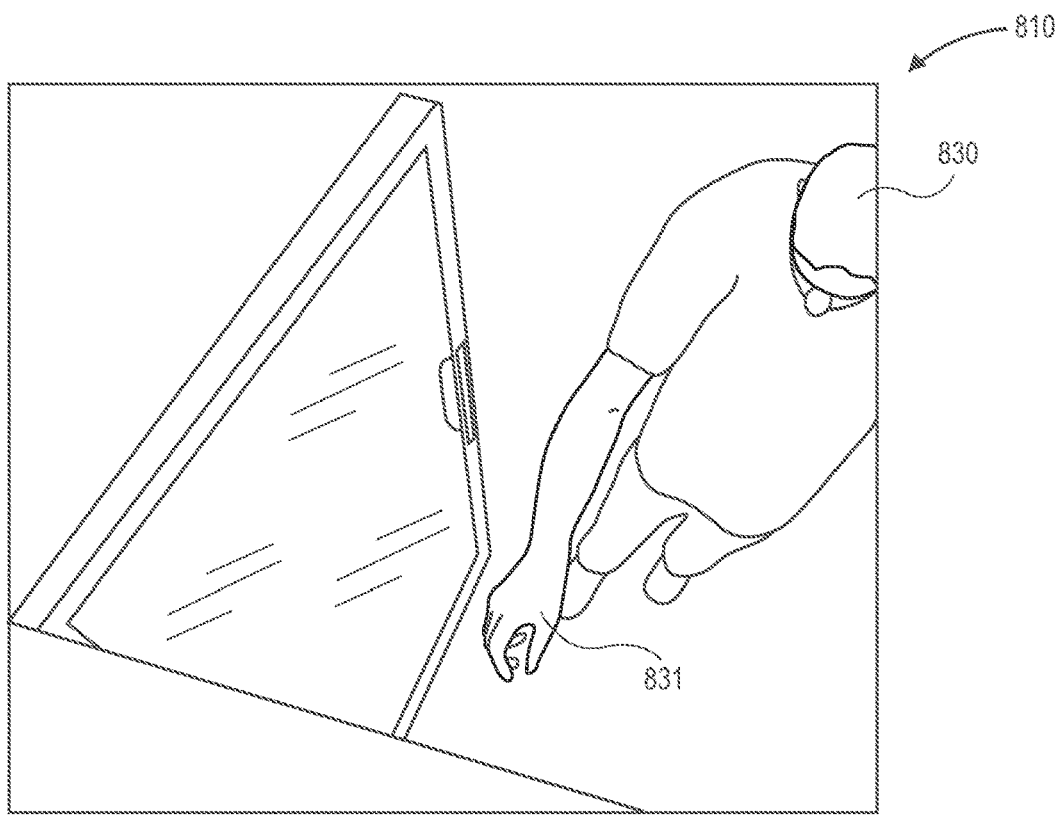
FIGS. 8A and 8B illustrate an example prior event and post event images generated with an imaging component of a kiosk, in accordance with described implementations.
Figure 8B:
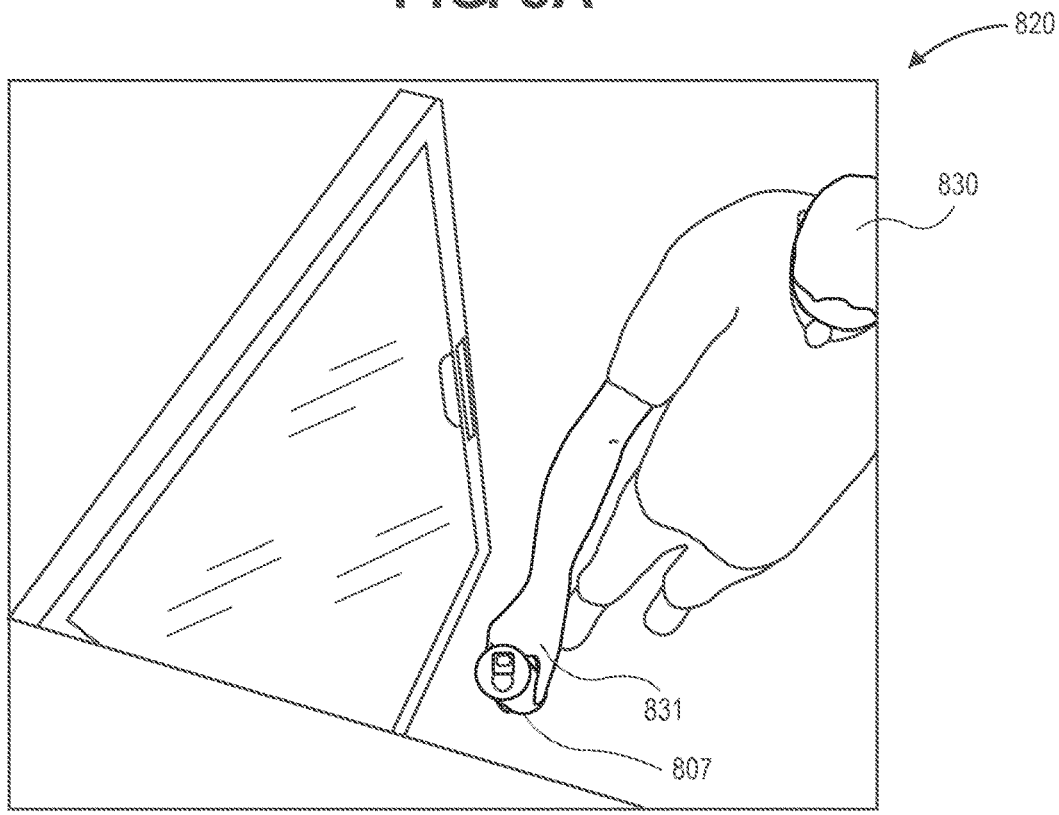

As discussed above, the imaging element of the kiosk may be positioned above the door of the kiosk and oriented to obtain images just forward of the kiosk that would include a customer 830 and any items picked or placed by the customer, but not include representations of items that remain in the kiosk. For example, FIGS. 8A and 8B illustrate an example prior event image 810 (FIG. 8A) and post event image 820 (FIG. 8B) generated with an imaging component of a kiosk, in accordance with described implementations.

As illustrated, based on the position and orientating of the imaging element, the field of view of the imaging element is down and in front of the kiosk such that images of a hand 831 of a customer 830 reaching into and out of the kiosk are captured by the imaging element. Likewise, as illustrated in the post event image 820, the image includes a representation of an item 807 picked by the customer that the customer is removing from the kiosk. By positioning the imaging element downward and forward of the kiosk, as illustrated, images of an item held in a hand of a customer can be captured without also including images of items that remain on a shelf within the kiosk, thereby simplifying image processing and increasing the accuracy of item detection from the image processing, because the item(s) involved in the event are the only item(s) represented in the images.

Image processing may identify one or more potential items that are involved in the event. Based on the orientation of the item when captured in the image, the position of the user, etc., a single item may not be discernable from the image processing. For example, referring to the item 807 illustrated in FIG. 8B, the image processing may be able to identify that the item is a can of soda. However, if the kiosk includes inventory of multiple different types of cans of soda, such as soda cans from producer A and soda cans from producer B, the image processing may only be able to identify potential items of inventory corresponding to those different types of soda cans. In other examples, multiple event images before, during, and/or after the event may be processed and the results combined in an effort to narrow or specifically identify an item represented in the image.

Returning to FIG. 7A, a determination may also be made as to whether the item is an item pick, as in 706. As discussed above, the event list and/or event data for the event may indicate based on the event weight change whether the event is an item pick or an item place.

If it is determined that the event is an item pick, a determination is made as to whether the potential image(s) determined from the image processing correspond to an inventory item type associated with the area/weight sensor at which the event occurred, as in 708. If it is determined that one of the potential items determined from the image processing correspond to an item type associated with the area/weight sensor at which the event occurred, a determination may be made as to whether the match between the potential item and the item type corresponding to the area is to be verified, as in 710.

Returning to decision bock 706, if it is determined that the event is not an item pick (i.e., the event is an item place), a determination is made as to whether a potential item(s) determined from the image processing matches a candidate item determined from the example process 500 and/or if a potential item(s) matches an item indicated on the item pick list for the session, as in 712.

If it is determined at decision clock 710 that the potential item(s) is to be verified or if it is determined at decision block 712 that the potential item(s) does not match any of the candidate items and/or an item(s) on the item pick list, the potential item(s) from the image processing is indicated, as in 714, and the event is added to a manual verify event list, as in 716. Likewise, if it is determined at decision block 708 that the potential item(s) determined from the image processing do not correspond to inventory items associated with the area at which the event occurred, the event is added to the manual verify event list, as in 716.

If it is determined at decision block 712 that the potential item(s) determined from the image processing match a candidate item(s) and/or an items(s) on the item pick list, the item count of the item is decremented on the item pick list to indicate that the item(s) has been placed back into the kiosk, as in 718 (FIG. 7B). Likewise, the item count of the item on the kiosk inventory list and the kiosk area inventory list is incremented to indicate that the item has been placed back into the kiosk, as in 720. In addition, the event may be indicated as complete, as in 722.

In addition, a determination is made as to whether the item(s) determined to have been placed back to an area within the kiosk are of an item type associated with the area, as in 724. If it is determined that the items are not of the item type corresponding to the area at which the event occurred, the area status is updated to indicate that the area has a mixed item type inventory, as in 726.

Returning to decision block 710, if it is determined that the potential items involved in the item pick do not need to be verified, the item pick list may be incremented to indicate that an item(s) of the item type determined for the event has been picked from the kiosk, as in 732. Likewise, the kiosk inventory list and the kiosk area inventory list for the area at which the event occurred may be decremented to indicate that the item(s) of the determined item type have been picked from the area within the kiosk, as in 734. Likewise, the event may be indicated as complete, as in 736.

After indicating the event as complete at block 736, indicating the area status as a mixed area at block 726, after adding the event to the manual verify event list at block 716, or if it is determined at decision block 724 that the item(s) corresponds to item(s) associated with the area at which the event occurred, a determination is made as to whether additional unidentified events are indicated on the unidentified event list, as in 728. If it is determined that additional unidentified events remain on the event list, the example process 700 returns to block 704 and continues, as discussed above. If it is determined that no unidentified events remain for processing, the manual verify list is returned and the example process 700 completes, as in 730. The manual verify list may indication, among other information, one or more of events for which an item has not been identified, the action type of the event, an area at which the event occurred, etc.

Figure 9A:
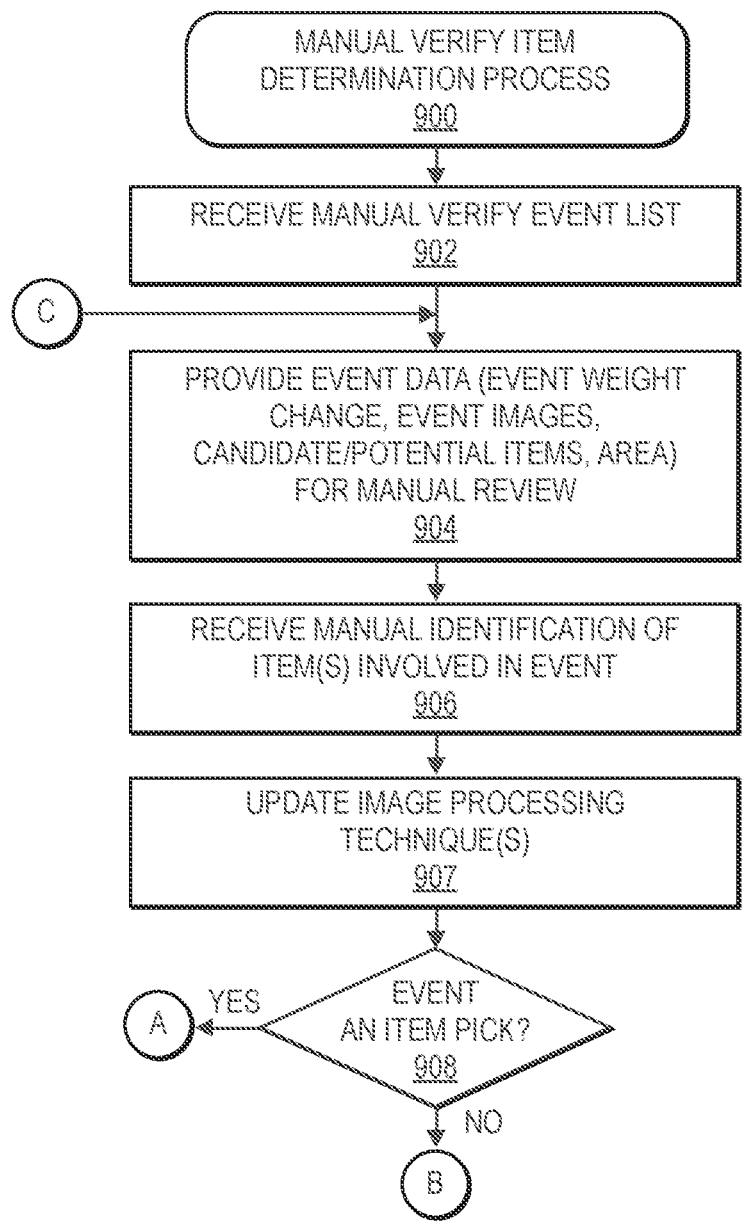
FIGS. 9A through 9B illustrate an example manual verify item determination process, in accordance with described implementations.
Figure 9B:
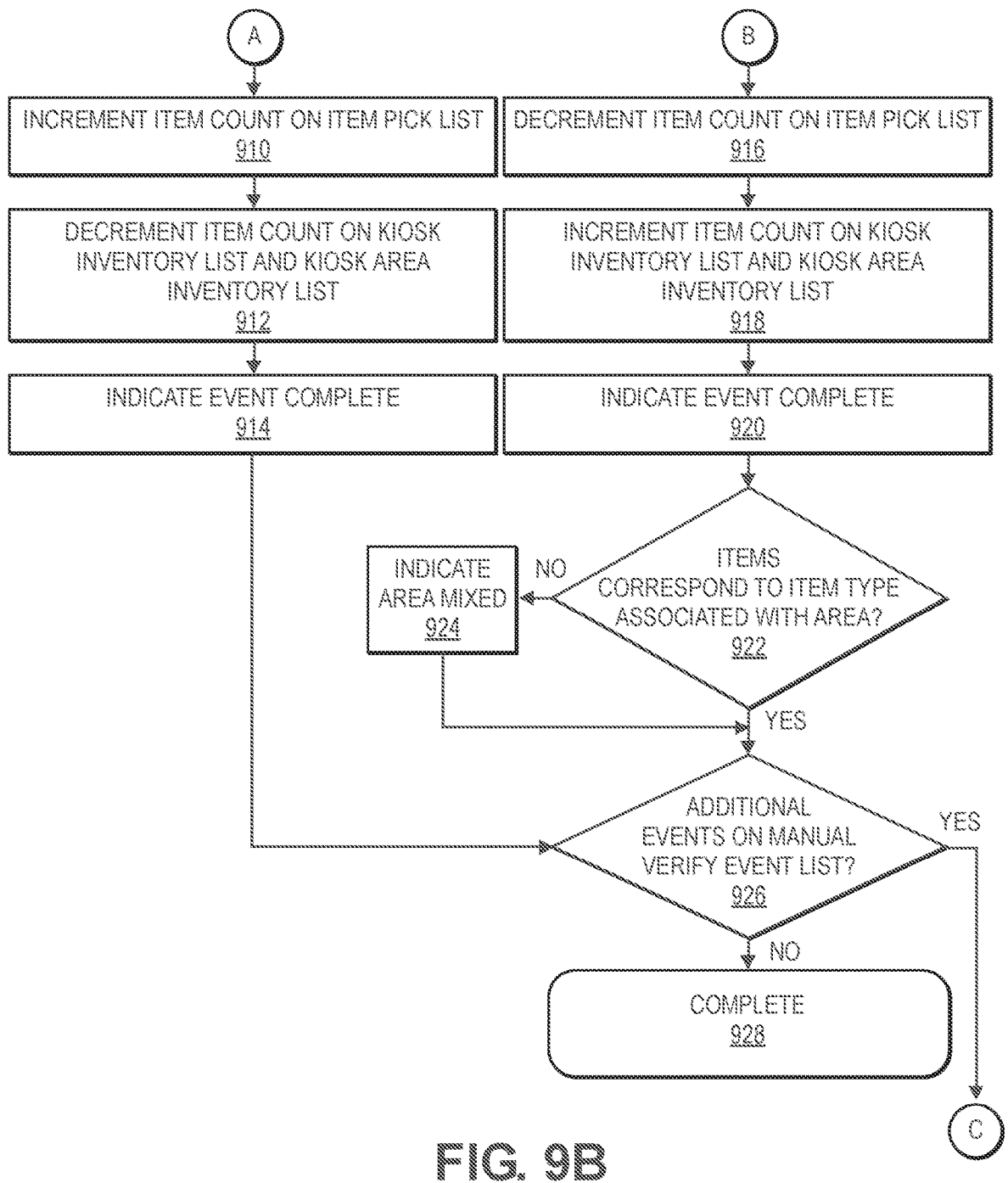

FIGS. 9A through 9B illustrate an example manual verify item determination process 900, in accordance with described implementations.

The example process may be performed for any events for which the item could not be determined by the weight based item determination process 600 or the image based item determination process 700, discussed above. The example process 700 begins upon receipt of the manual verify event list generated from the example process 700, as in 902. For a first or next event indicated on the manual verify event list, the event data, such as the event weight change, event images, candidate/potential items, kiosk area at which the event occurred, etc., is provided to one or more agents for manual review and identification of the event, as in 904.

After the event information is provided for manual review, a manual identification of the item(s) involved in the event are received back from an agent that performed the manual verification, as in 906. In some implementations, the results from the manual review may be used as labels for the event images, which may be provided as feedback to further improve one or more image processing techniques utilized by the example image based item determination process, as in 907. For example, if the example image based item determination process 700 utilizes a machine learning model to process event images, the event images and the results from the manual review, in particular the identity of the item represented in the event images, may be used as feedback to continually train and improve the image processing performed by the machine learning model.

Returning to FIG. 9A, a determination may also be made as to whether the event is an item pick, as in 908. If it is determined that the event is an item pick, a count of the item determined to be picked from the area within the kiosk is incremented on the item pick list for the session, as in 910 (FIG. 9B). Likewise, the item count for the item indicated on the kiosk inventory list and the kiosk area inventory list is decremented to indicate that the item(s) was picked from the area of the kiosk, as in 912. Finally, the event is indicated as complete, as in 914.

If it is determined at decision block 908 that the event is not an item pick (i.e., the event is an item place), the item count for the item(s) is decremented on the item pick list to indicate that the item has been placed back into the area of the kiosk, as in 916. Likewise, the kiosk inventory list and the kiosk area inventory list for the area at which the event occurred are incremented to indicate that the item has been placed at the area within the kiosk, as in 918. In addition, the event may be indicated as complete, as in 920.

A determination is also made as to whether the item placed at the area in the kiosk is of an item type that corresponds to the item type associated with the area, as in 922. If it is determined that the item(s) determined to be placed at the area in the kiosk do not correspond to the item type(s) associated with the area, the status of the area is updated to indicate that the area includes mixed item types, as in 924. If it is determined at decision block 922 that the item type of the item(s) determined to have been placed at the area correspond to the item type(s) associated with the area or after the event is indicated as complete at block 914, a determination is made as to whether additional events remain on the manual verify event list for verification, as in 926. If it is determined that events remain on the manual verify event list, the example process 900 returns to block 904 (FIG. 9A) and continues, as discussed above. If it is determined that no events remain for manual verification, the example process 900 completes, as in 928.

In some implementations, as part of the manual verify item determination process 900 and/or as part of the example image based item determination process 700, event images may also be processed to identify any potential problems with the kiosk (e.g., electrical problems, mechanical problems). Likewise, as part of the weight based item determination process 600, the image based item determination process 700, and/or the example manual verify item determination process 900, the weight sensor data may be analyzed to determine any potential problems with the kiosks. For example, image data may be processed to determine any potential lighting failures of lights within the kiosk, leaking or broken inventory items, dirty trays/areas, dust, etc. As another example, weight sensor data may be evaluated alone or in combination with image data to determine if one or more weight sensors are potentially failing or have failed. For example, if a weight sensor generates weight change data at various times when there is no event and/or no session in progress, comparison of the weight change data along with image data to verify that no event occurred, may be indicative of a weight sensor problem/failure.

Figure 10:
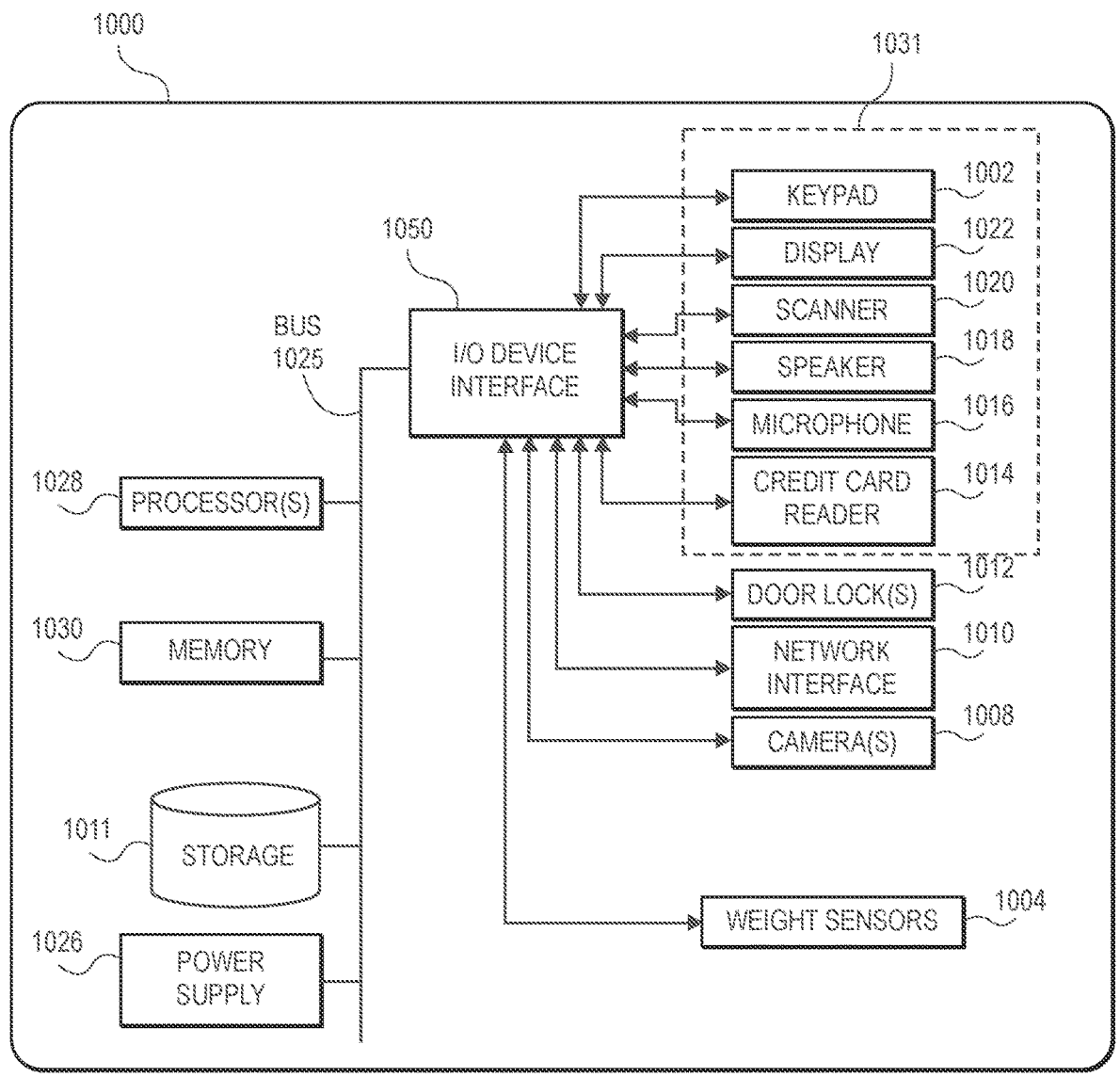
FIG. 10 is a block diagram conceptually illustrating components of an example kiosk, in accordance with described implementations.
Figure 11:
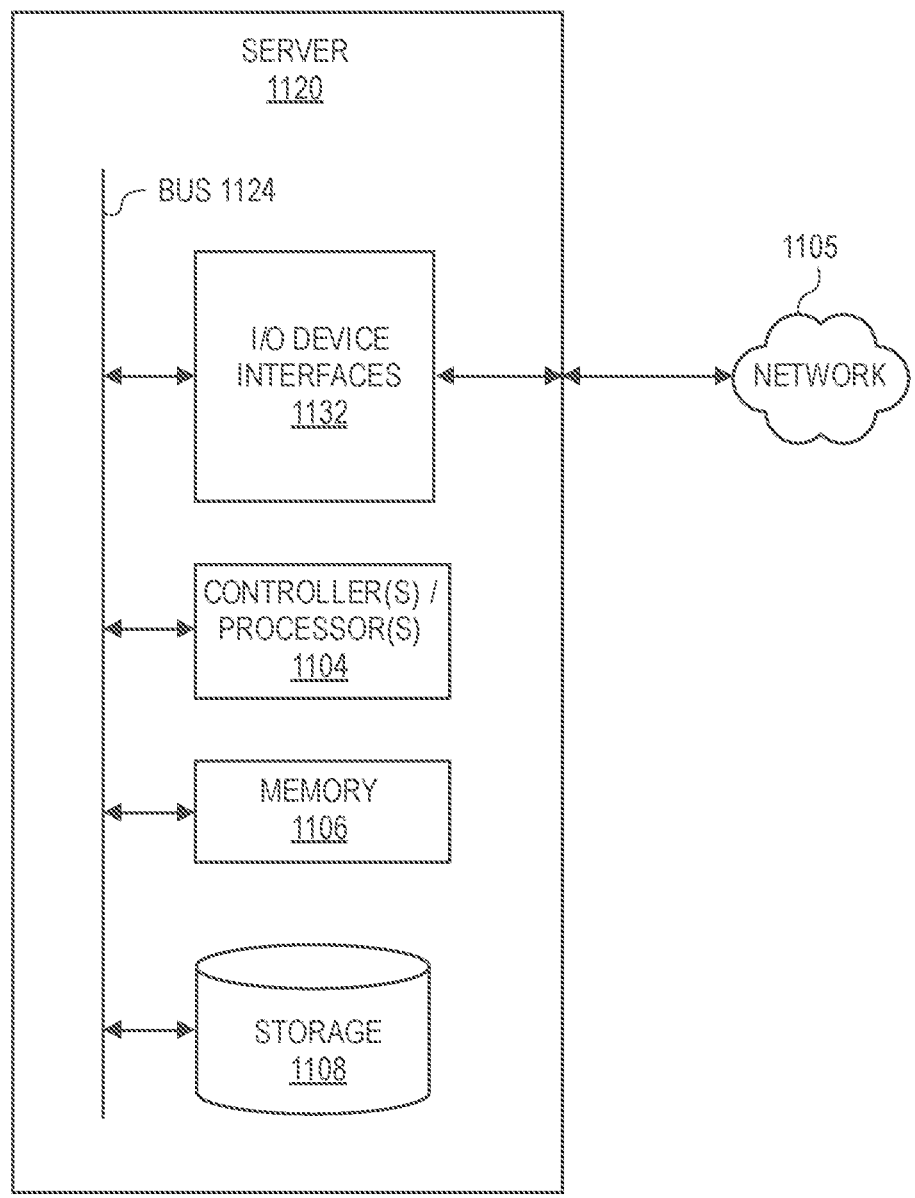
FIG. 11 is a block diagram conceptually illustrating example components of a remote computer resource, in accordance with described implementations.

FIG. 10 is a block diagram conceptually illustrating components of a kiosk 1000, in accordance with described implementations. FIG. 11 is a block diagram conceptually illustrating example components of a remote computer resource, such as a remote server 1120 that may be included as part of a kiosk service, as discussed above. In operation, each of these devices (or groups of devices) may include computer-readable and computer-executable instructions that reside on the respective device (1000/1120), as will be discussed further below.

Each of these devices (1000/1120) may include one or more controllers/processors (1028/1104), that may each include a central processing unit (CPU) for processing data and computer-readable instructions, and a memory (1030/1106) for storing data and instructions of the respective device. The memories (1030/1106) may individually include volatile random access memory (RAM), non-volatile read only memory (ROM), non-volatile magnetoresistive (MRAM) and/or other types of memory. Each device may also include a data storage component (1011/1108), for storing data, controller/processor-executable instructions, kiosk inventory lists, kiosk area inventory lists, even lists, event data, inventory layouts, session data, etc. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1050/1132).

Computer instructions for operating each device (1000/1120) and its various components may be executed by the respective device's controller(s)/processor(s) (1028/1104), using the memory (1030/1106) as temporary "working" storage at runtime. A device's computer instructions may be stored in a non-transitory manner in non-volatile memory (1030/1106), storage (1011/1108), or an external device(s). Alternatively, some or all of the executable instructions may be embedded in hardware or firmware on the respective device in addition to or instead of software.

Each device (1000/1120) includes input/output device interfaces (1050/1132). A variety of components may be connected through the input/output device interfaces. Additionally, each device (1000/1120) may include an address/data bus (1025/1124) for conveying data among components of the respective device. Each component within a device (1000/1120) may also be directly connected to other components in addition to (or instead of) being connected to other components across the bus (1025/1124).

Referring to the kiosk 1000 of FIG. 10, the kiosk 1000 may include input/output device interfaces 1050 that connect to a variety of components. For example, the kiosk 1000 may include a variety of unique identifier sensors 1031, such as a keypad 1002, display 1022, such as a touch-based display, scanner 1020, such as a biometric scanner, speaker 1018, microphone 1016, credit card reader 1014, etc.

As discussed above, the kiosk 1000 may also include door locks 1012, also referred to herein as door locking mechanisms, that may be selectively engaged or disengaged to secure or release a door of the kiosk 1000. Other input/output devices may also be included on the kiosk. For example, in addition to the devices illustrated, the kiosk may include lights, sirens, temperature sensors, motion sensors, etc. In addition, the kiosk 1000 may include a plurality of weight sensors 1004 that measure weight sensor data at various areas within the kiosk during a session, as well as one or more imaging elements or cameras 1008 that generate and record image data during a session.

The device may also include a network interface 1010, such as an antenna and/or a wired network connection. Any form of wired and/or wireless communication may be utilized to facilitate communication between the kiosk 1000 and other devices, such as a customer device and/or remote computer resources. For example, any one or more of 802.15.4 (ZIGBEE), 802.11 (WI-FI), 802.16 (WiMAX), BLUETOOTH, Z-WAVE, near field communication ("NFC"), etc., may be used to communicate between the device 1000 and one or more other devices. For example, via the antenna(s), the kiosk 1000 may connect to one or more networks via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, 5G network, etc. A wired connection such as Ethernet may also be supported.

In some implementations, the kiosk may also include a power supply 1026 such as a battery and/or solar power that may be operable to maintain operation of the kiosk 1000 in the event of a power failure.

The components of the kiosk 1000 and server 1120, as illustrated in FIGS. 10 and 11, are exemplary, and may be located as a stand-alone device or may be included, in whole or in part, as a component of a larger device, system, or service, such as the kiosk service discussed herein.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, inventory management, and kiosks should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount. Likewise, the terms "good," "moderate," and "poor" are used to relate to ranges of sleep scores and/or the corresponding quality of sleep.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   at a kiosk:
   detecting a unique identifier corresponding to an account;
   in response to detecting the unique identifier, verifying that the unique identifier is valid and that access to the kiosk is to be provided;

in response to verifying that the unique identifier is valid and without first receiving an indication of an item to be retrieved from the kiosk or charging the account for a purchase or removal of an item from the kiosk, initiating a session during which access to a plurality of items contained within the kiosk is available;

recording, during the session, weight sensor data from a plurality of weight sensors within the kiosk;

recording, during the session, image data from a camera coupled to the kiosk;

determining that access to the plurality of items within the kiosk has ended; and in response to determining that the access has ended:
completing the session;
determining, based at least in part on weight sensor data from a first weight sensor of the plurality of weight sensors, a first weight change as a first difference between a first weight measured by the first weight sensor during the session and a second weight measured by the first weight sensor during the session;
determining, based at least in part on the first weight change and an area within the kiosk associated with the first weight change, both a first action corresponding to the first weight change and a first item type of a first item involved in the first action;
updating an item pick list for the session based at least in part on the first action and the first item type;
updating an inventory count for the first item type at the kiosk; and
updating the account to indicated the first action and the first item type of the first item involved in the first action during the session at the kiosk.

2. The computer-implemented method of claim 1, further comprising:
at the kiosk:
determining, based at least in part on weight sensor data from a second weight sensor of the plurality of weight sensors, a second weight change as a second difference between a third weight measured by the second weight sensor during the session and a fourth weight measured by the second weight sensor during the session;
determining that a second item type of a second item cannot be determined from the second weight change;
in response to determining that the second item type cannot be determined from the second weight change:
obtaining image data generated by the camera and corresponding to a time at which the second weight change occurred during the session; and
generating event data that includes at least the second weight change, the image data, and an area identifier indicating an area within the kiosk at which the second weight change occurred;
sending, to a remote computer resource, the event data;
at the remote computer resource:
processing the image data to determine one or more potential item types of the second item represented in the image data;
determining, based at least in part on the one or more potential item types, the second weight change, and the area identifier, the second item type of the second item corresponding to the second weight change; and
sending, to the kiosk, an indication of the second item type of the second item.

3. The computer-implemented method of claim 1, further comprising:
at the kiosk:
determining, based at least in part on weight sensor data from a second weight sensor of the plurality of weight sensors, a second weight change as a second difference between a third weight measured by the second weight sensor during the session and a fourth weight measured by the second weight sensor during the session;
determining that a second item type of a second item cannot be determined from the second weight change;
in response to determining that the second item type cannot be determined from the second weight change:
obtaining image data generated by the camera and corresponding to a time at which the second weight change occurred during the session; and
generating event data that includes at least the second weight change, the image data, and an area identifier indicating an area within the kiosk at which the second weight change occurred;
sending, to a remote computer resource, the event data;
at the remote computer resource:
determining that the second item cannot be determined from the event data;
sending the event data for a manual review to determine the second item type of the second item corresponding to the second weight change;
receiving, from the manual review, an indication of the second item type; and
sending, to the kiosk, the indication of the second item type of the second item.

4. The computer-implemented method of claim 3, further comprising:
providing at least a portion of the event data and the indication of the second item type as feedback to a machine learning model to improve an item recognition of the machine learning model.

5. The computer-implemented method of claim 1, wherein:
the first action is a pick of an item of the first item type; and
updating the item pick list includes indicating the item of the first item type and a weight change determined for the first action.

6. The computer-implemented method of claim 1, wherein determining both the first action and the first item type is further based at least in part on:
stored inventory data maintained in a data store of the kiosk, the stored inventory data indicating the first item type corresponding to the area and an average stored item weight of the first item type.

7. The computer-implemented method of claim 1, wherein:
the first action is a pick of the first item of the first item type from a first area within the kiosk, wherein the first area corresponds to the first weight sensor of the plurality of weight sensors; and
updating the item pick list includes incrementing an item count for the first item type;

the method further comprising:
  at the kiosk:
    determining, based at least in part on weight sensor data from a second weight sensor, a second weight change as a second difference between a third weight measured by the second weight sensor during the session and a fourth weight measured by the second weight sensor during the session;
    determining, based at least in part on the second weight change, a second action of a place of an item of the first item type to a second area within the kiosk, wherein the second area corresponds to the second weight sensor of the plurality of weight sensors;
    updating the item pick list to decrement the item count for the first item type; and
    indicating that the second area includes mixed item types.

8. The computer-implemented method of claim 1, wherein determining both the first action and the first item type, further includes:
  determining, from a data store at the kiosk, a stored item weight for a first item type associated with a first area corresponding to the first weight sensor;
  determining that the first weight change is within a range of the stored item weight for the first item type; and
  in response to determining that the first weight change is within the range of the stored item weight, determining that the first item of the first item type was involved in the first action.

9. The computer-implemented method of claim 1, further comprising:
  at the kiosk:
    determining, based at least in part on weight sensor data from a second weight sensor of the plurality of weight sensors, a second weight change as a second difference between a third weight measured by the second weight sensor and a fourth weight measured by the second weight sensor;
    determining, based at least in part on weight sensor data from the second weight sensor of the plurality of weight sensors, a third weight change as a third difference between a fifth weight measured by the second weight sensor and a sixth weight measured by the second weight sensor;
    determining that the second weight change and the third weight change occurred adjacent in time;
    determining that a sum of the second weight change and the third weight change results in a net zero weight change; and
    in response to determining that the second weight change and the third weight change occurred adjacent in time and that the sum of the second weight change and the third weight change result in the net zero weight change, filtering out the second weight change and the third weight change from the session.

10. The computer-implemented method of claim 9, further comprising:
  determining that the second weight change occurred at a first area within the kiosk;
  determining that the third weight change occurred at the first area within the kiosk; and
  wherein filtering is further based at least in part on determining that the second weight change and the third weight change occurred at the first area.

11. The computer-implemented method of claim 1, further comprising:
  at the kiosk:
    determining, based at least in part on weight sensor data from a second weight sensor of the plurality of weight sensors, a second weight change as a second difference between a third weight measured by the second weight sensor and a fourth weight measured by the second weight sensor;
    determining that the second weight change does not exceed a minimum threshold value; and
    in response to determining that the second weight change does not exceed the minimum threshold value, filtering out the second weight change from the session.

12. The computer-implemented method of claim 1, wherein verifying the unique identifier is valid includes querying a database maintained at the kiosk to verify that the unique identifier is valid.

13. The computer-implemented method of claim 1, wherein verifying the unique identifier is valid includes:
  sending the unique identifier to a remote computer resource; and
  receiving, from the remote computer resource, a confirmation that the unique identifier is valid.

14. The computer-implemented method of claim 1, further comprising:
  sending, to a remote computer resource, at least an indication of the unique identifier, the first action, and the first item type; and
  wherein updating the account is performed at the remote computer resource.

15. The computer-implemented method of claim 14, further comprising:
  prior to sending at least the indication of the unique identifier, the first action, and the first item type:
    determining that a network connection between the kiosk and the remote computer resource is unavailable; and
    allowing a second session to be initiated at the kiosk before sending at least the indication of the unique identifier, the first action, and the first item type to the remote computer resource.

16. The computer-implemented method of claim 1, further comprising:
  at a device and prior to the kiosk initiating the session:
    sending, to a remote computer resource, a request for the unique identifier;
    receiving, from the remote computer resource and in response to the request, the unique identifier; and
    sending the unique identifier to the kiosk to initiate the session.

17. The computer-implemented method of claim 16, wherein:
  the remote computer resource includes a kiosk service that manages a plurality of kiosks; and
  the unique identifier may be utilized to access two or more of the plurality of kiosks.

18. A kiosk apparatus, comprising:
  one or more processors; and
  a memory storing program instructions that, when executed by the one or more processors, cause the one or more processors to at least:
    detect a unique identifier corresponding to an account;
    in response to detection of the unique identifier, verify that the unique identifier is valid and that access to the kiosk apparatus is to be provided;
    in response to verification that the unique identifier is valid and without first receiving an indication of an item to be retrieved from the kiosk apparatus or charging for a purchase or removal of an item from the kiosk apparatus, initiate a session during which access to a plurality of items contained within the kiosk apparatus is available;

record, during the session, weight sensor data from a plurality of weight sensors within the kiosk apparatus;

record, during the session, image data from a camera coupled to the kiosk apparatus;

determine that access to the plurality of items within the kiosk apparatus has ended; and in response to determination that the access has ended:
  determine, based at least in part on weight sensor data from a first weight sensor of the plurality of weight sensors, a first weight change determined at the first weight sensor during the session;
  determine, based at least in part on the first weight change and an area within the kiosk apparatus associated with the first weight change, both a first action corresponding to the first weight change and a first item type of a first item involved in the first action;
  update an item pick list for the session based at least in part on the first action and the first item type;
  update an inventory count for the first item type at the kiosk apparatus; and
  update the account to indicated the first action and the first item type of the first item involved in the first action during the session at the kiosk apparatus.

19. The kiosk apparatus of claim 18, wherein the program instructions, when executed by the one or more processors, further cause the one or more processors to at least:

determine, based at least in part on weight sensor data from a second weight sensor of the plurality of weight sensors, a second weight change detected by the second weight sensor during the session;

determine that a second item type of a second item cannot be determined from the second weight change; and in response to determination that the second item type cannot be determined from the second weight change:
  obtain image data generated by the camera and corresponding to a time at which the second weight change occurred during the session;
  generate event data that includes at least the second weight change and the image data;
  send, to a remote computer resource, the event data; and
  receive, from the remote computer resource and in response to the event data, an indication of the second item type of the second item.

20. The kiosk apparatus of claim 18, wherein:

the first action is a pick of an item of the first item type; and update of the item pick list includes indicating the item of the first item type and a weight change determined for the first action.

21. The kiosk apparatus of claim 18, wherein determination of both the first action and the first item type is further based at least in part on:

stored inventory data maintained in a data store of the kiosk apparatus, the stored inventory data indicating the first item type corresponding to the area and a stored item weight of the first item type.

* * * * *